(12) United States Patent
Matsuoka et al.

(10) Patent No.: US 9,914,089 B2
(45) Date of Patent: Mar. 13, 2018

(54) ABSORPTION METHOD AND ABSORPTION DEVICE

(71) Applicant: KOBE STEEL, LTD., Kobe-shi (JP)

(72) Inventors: Akira Matsuoka, Kobe (JP); Koji Noishiki, Takasago (JP); Akitoshi Fujisawa, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 10 days.

(21) Appl. No.: 14/888,524

(22) PCT Filed: Jun. 20, 2014

(86) PCT No.: PCT/JP2014/066446
§ 371 (c)(1),
(2) Date: Nov. 2, 2015

(87) PCT Pub. No.: WO2015/001989
PCT Pub. Date: Jan. 8, 2015

(65) Prior Publication Data
US 2016/0107115 A1 Apr. 21, 2016

(30) Foreign Application Priority Data
Jul. 4, 2013 (JP) ................................. 2013-140607

(51) Int. Cl.
*B01D 53/14* (2006.01)
*B01D 53/18* (2006.01)
*B01J 19/00* (2006.01)

(52) U.S. Cl.
CPC ............ *B01D 53/18* (2013.01); *B01D 53/14* (2013.01); *B01J 19/00* (2013.01);
(Continued)

(58) Field of Classification Search
CPC .............. B01J 19/00; B01D 2252/103; B01D 2252/204; B01D 2257/504; B01D 53/14; B01D 53/18
See application file for complete search history.

(56) References Cited

U.S. PATENT DOCUMENTS 4,093,701 A 6/1978 Butwell
6,830,608 B1 * 12/2004 Peters ................. B01D 3/28
261/112.1
(Continued)

FOREIGN PATENT DOCUMENTS

DE 10 2004 007 527 A1 9/2005
JP 52-054680 5/1977
(Continued)

OTHER PUBLICATIONS

Akira Matsuoka et al., "Mixture Promoting Effect by Stacked Multi-Channel Reactor (SMCR)", SCEJ 43$^{rd}$ Autumn Meeting (Nagoya), Lecture No. :X215, Total 4 pages, 2011.*
(Continued)

*Primary Examiner* — Cabrena Holecek
(74) *Attorney, Agent, or Firm* — Oblon, McClelland, Maier & Neustadt, L.L.P.

(57) ABSTRACT

An absorption method includes: a step for preparing a minute passage; a main circulation step for circulating, in the minute passage, a gas as a first fluid containing a component to be absorbed and an absorbing liquid as a second fluid so that the component to be absorbed is absorbed from the gas into the absorbing liquid; and a sub-circulation step for circulating, while the gas and the absorbing liquid are circulated in the minute passage, a third fluid in the minute passage in order to raise the pressure inside the minute passage.

6 Claims, 17 Drawing Sheets

(52) U.S. Cl.
CPC .. *B01D 2252/103* (2013.01); *B01D 2252/204* (2013.01); *B01D 2257/504* (2013.01)

(56) References Cited

U.S. PATENT DOCUMENTS

| | | | |
|---|---|---|---|
| 2007/0085227 A1* | 4/2007 | Tonkovich | B01D 1/14 261/127 |
| 2012/0016140 A1 | 1/2012 | Jia et al. | |
| 2014/0133262 A1 | 5/2014 | Nishikawa et al. | |

FOREIGN PATENT DOCUMENTS

| | | |
|---|---|---|
| JP | 63-170206 | 7/1988 |
| JP | 2007-105668 A | 4/2007 |
| JP | 2007-136411 A | 6/2007 |
| JP | 2008-296211 A | 12/2008 |
| WO | 2012/176391 A1 | 12/2012 |

OTHER PUBLICATIONS

International Search Report and Written Opinion dated Sep. 30, 2014 for PCT/JP2014/066446 filed on Jun. 20, 2014.
Extended European Search Report dated Jan. 31, 2017 in European Patent Application No. 14819392.3.

\* cited by examiner

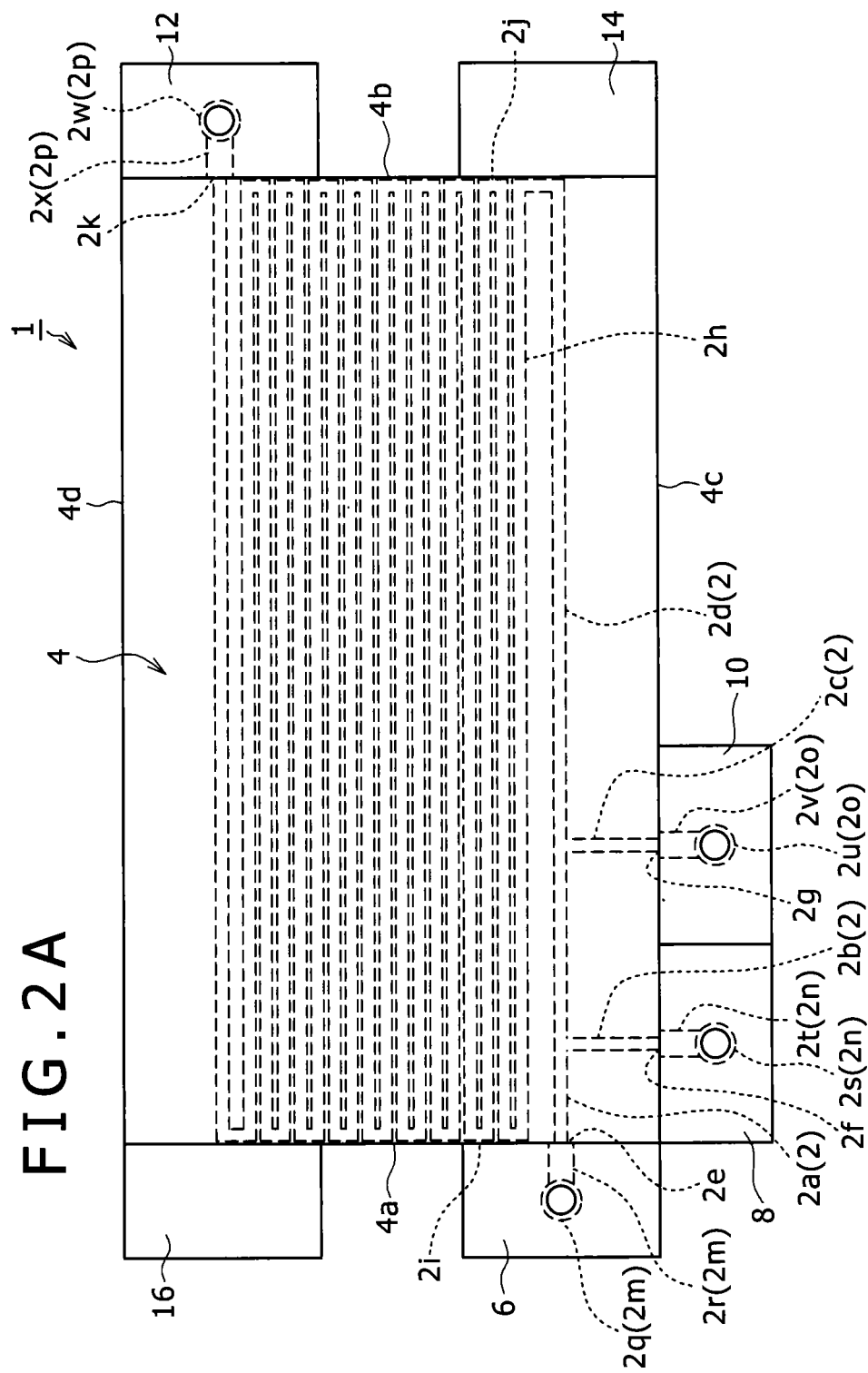

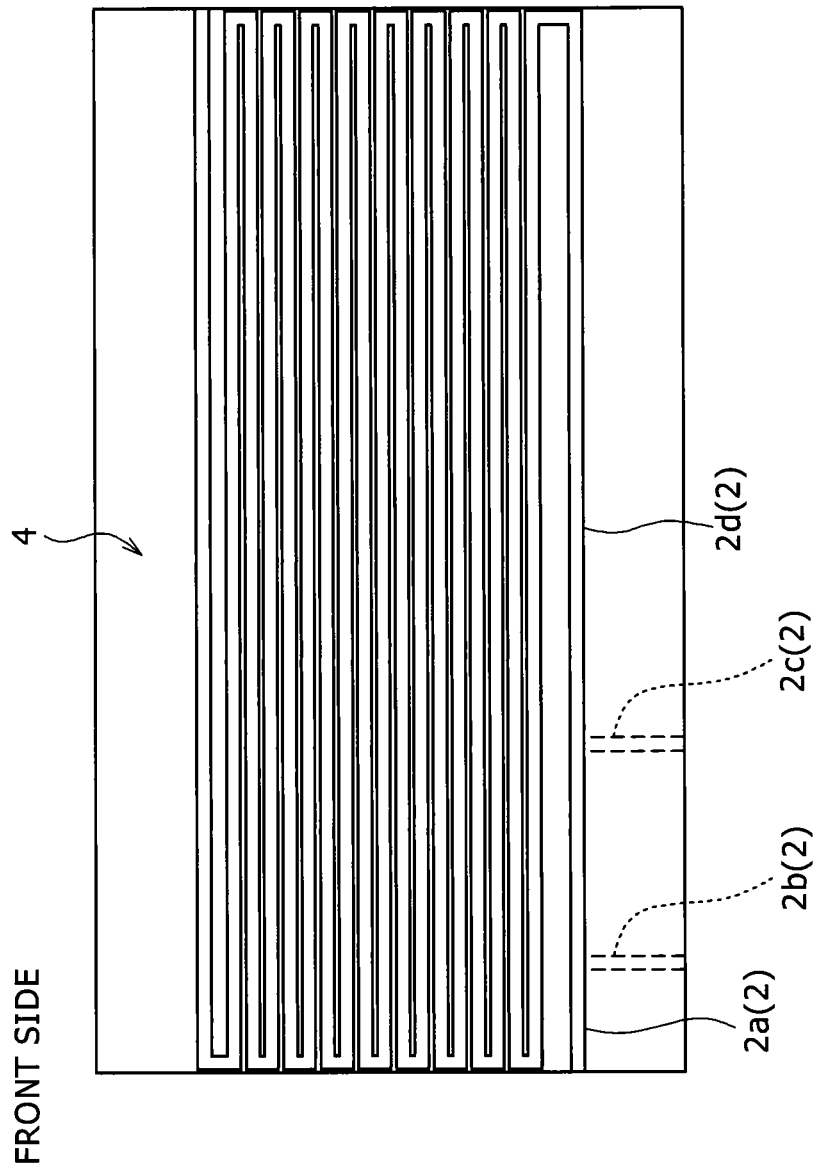

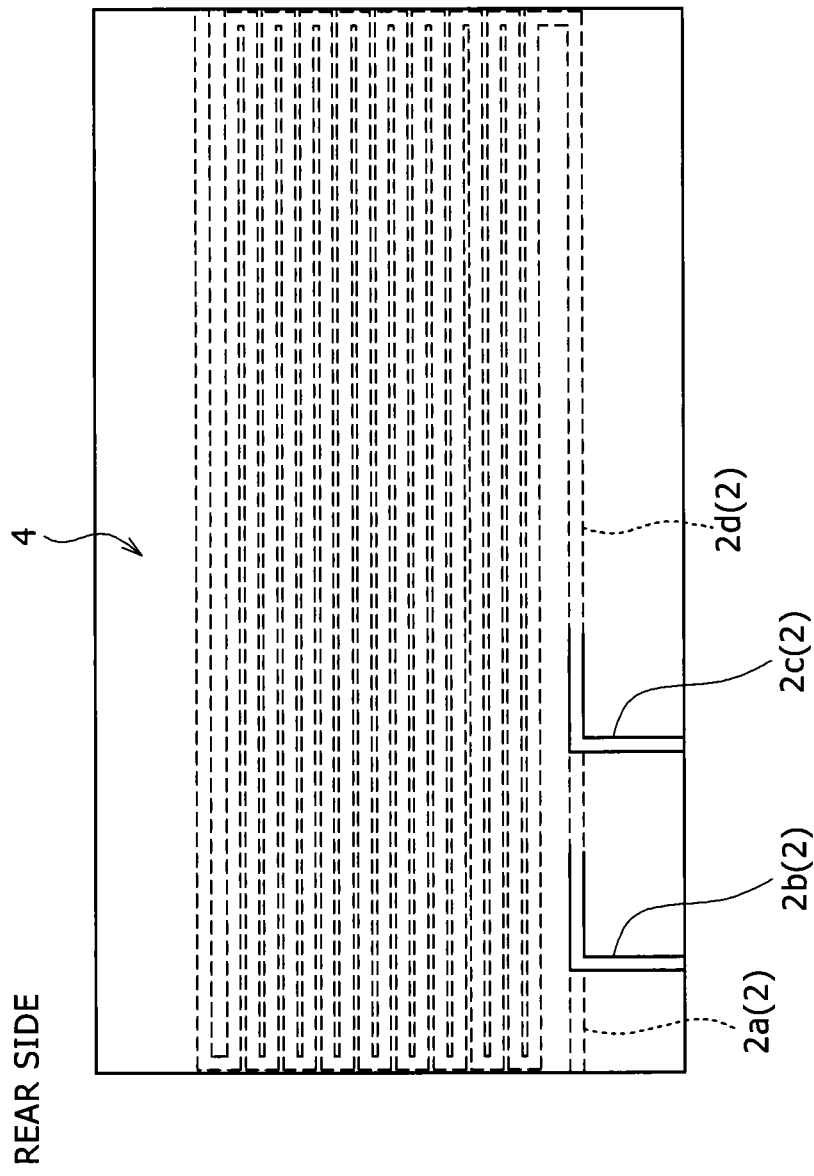

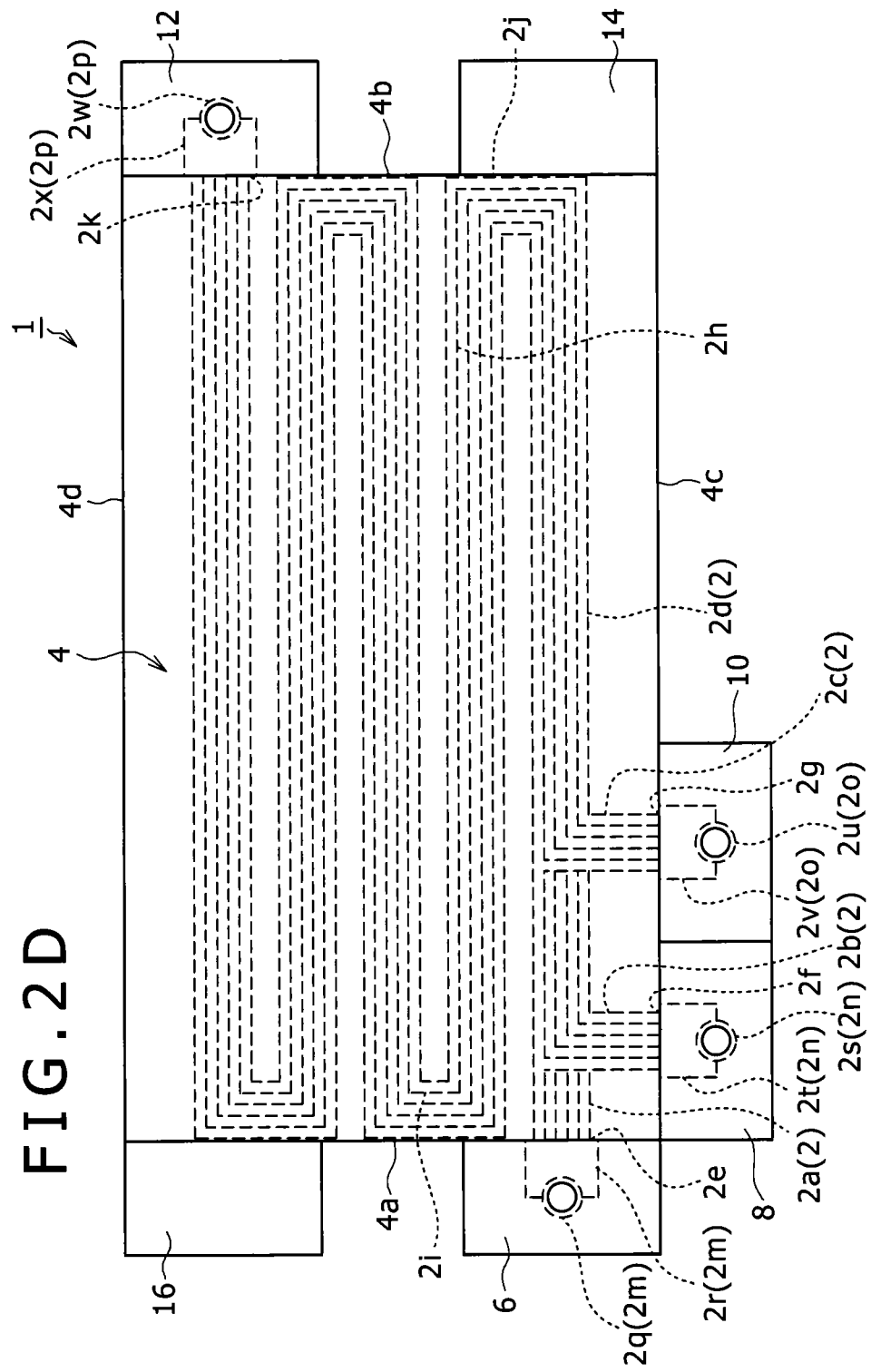

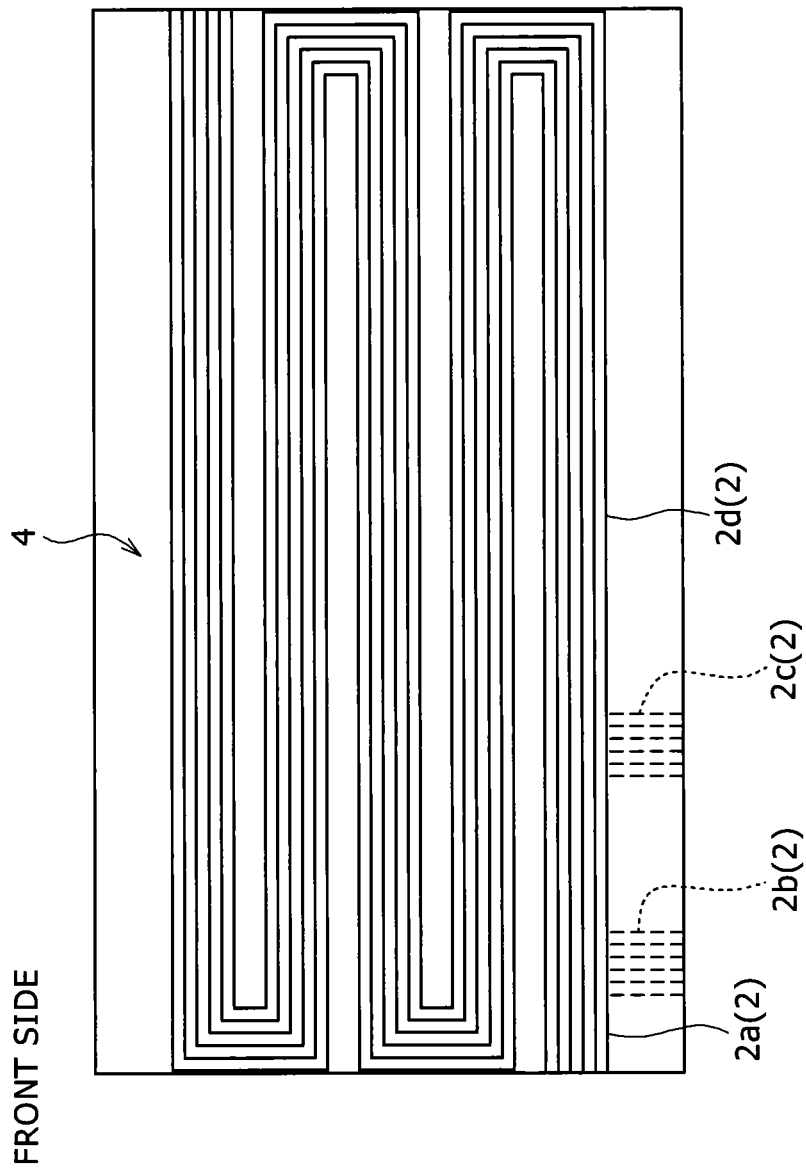

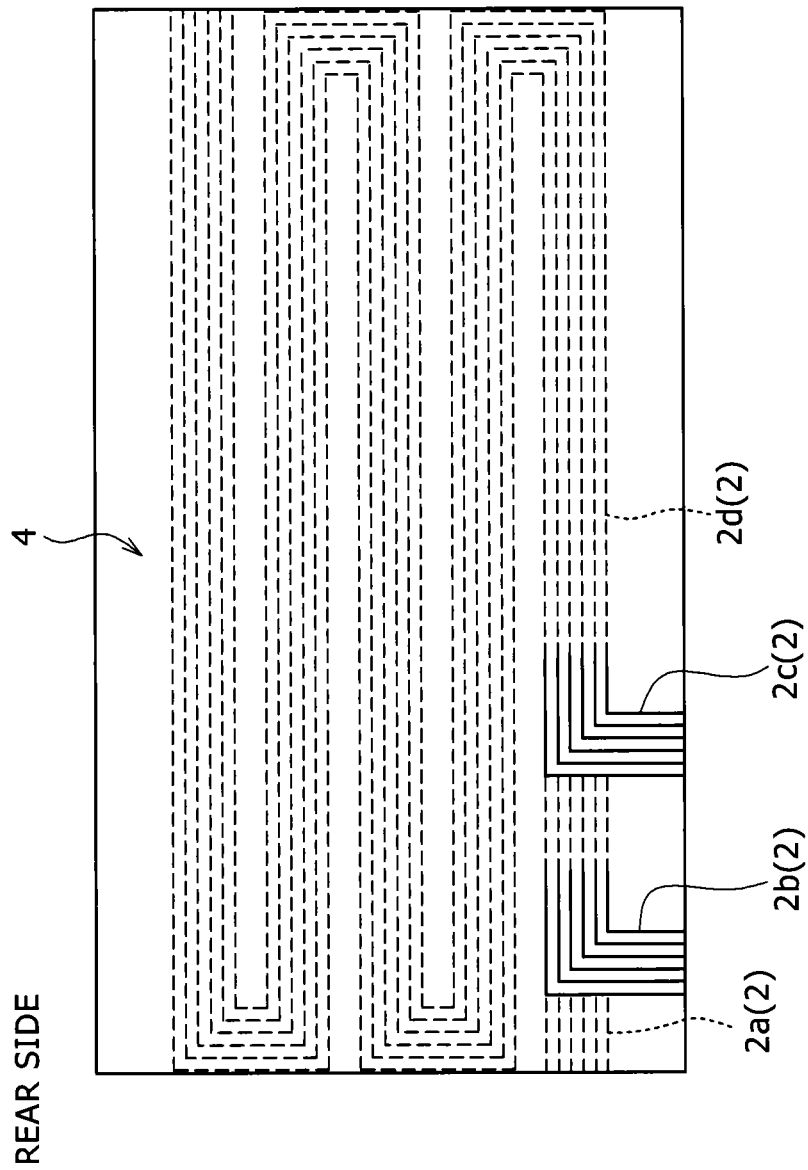

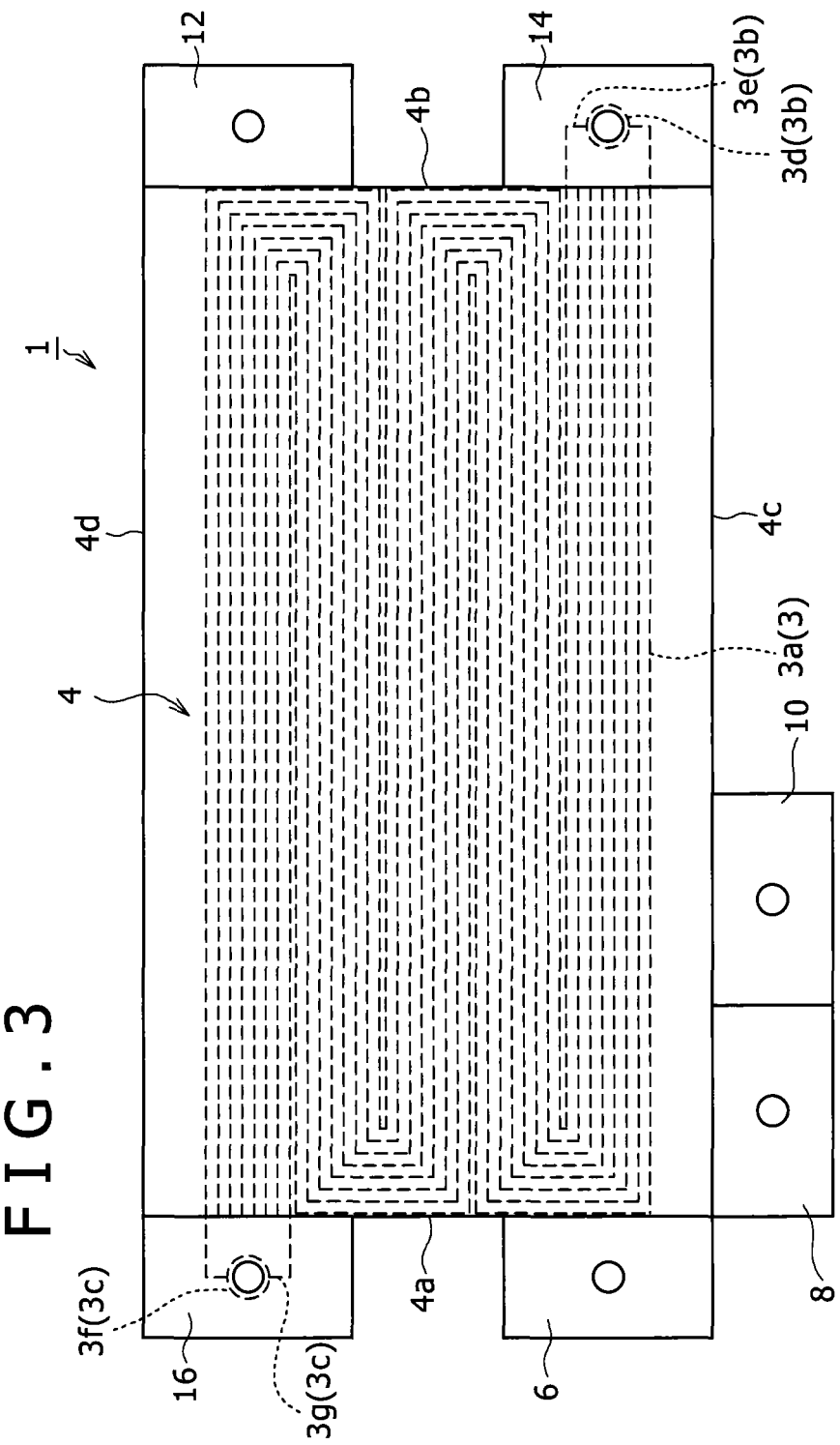

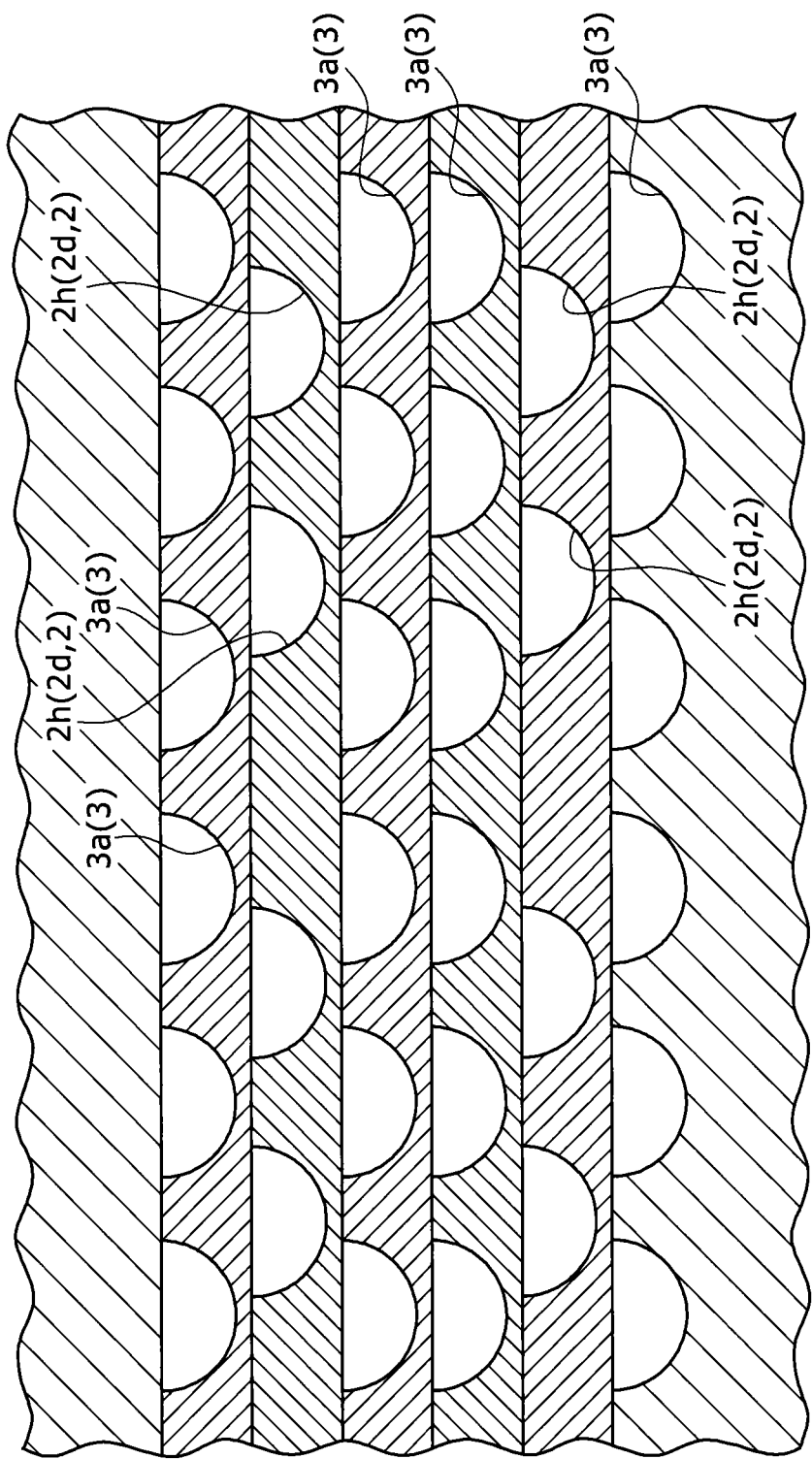

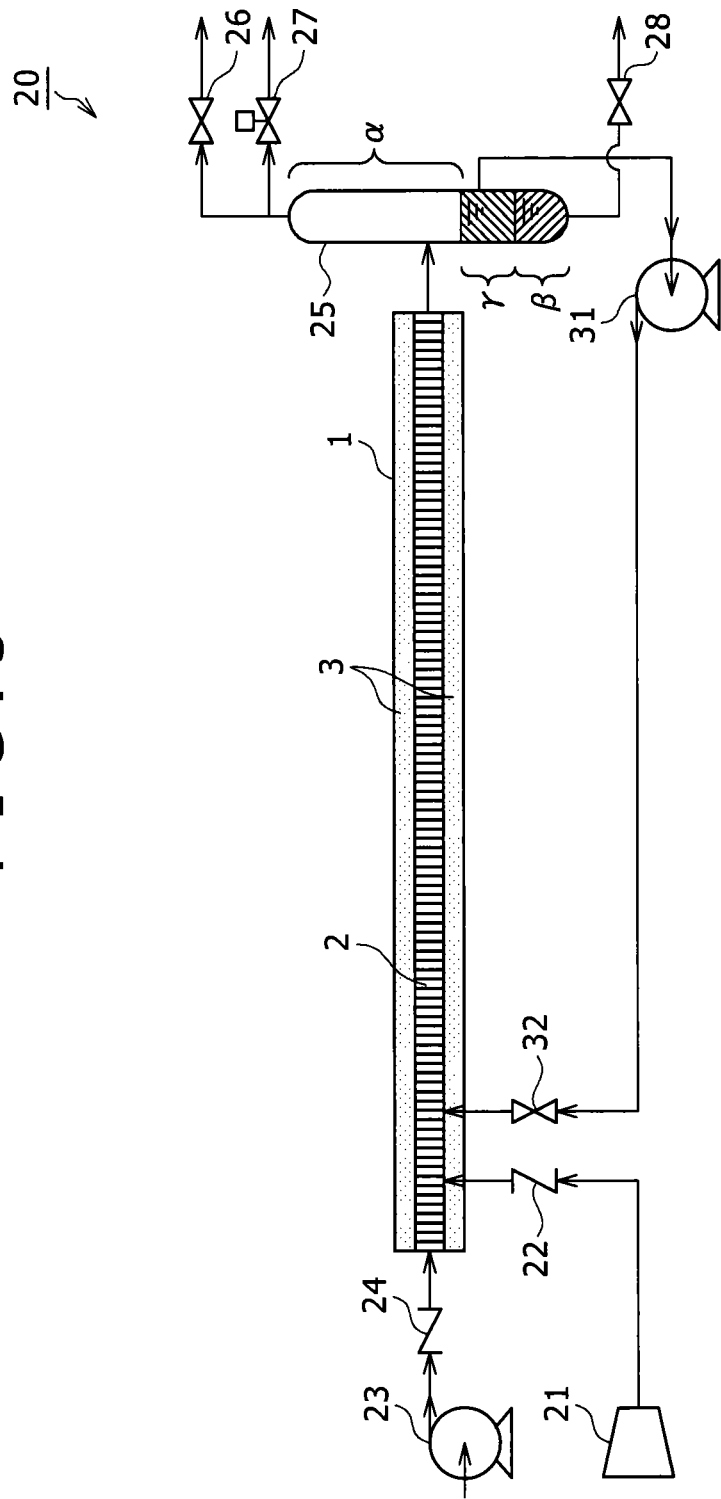

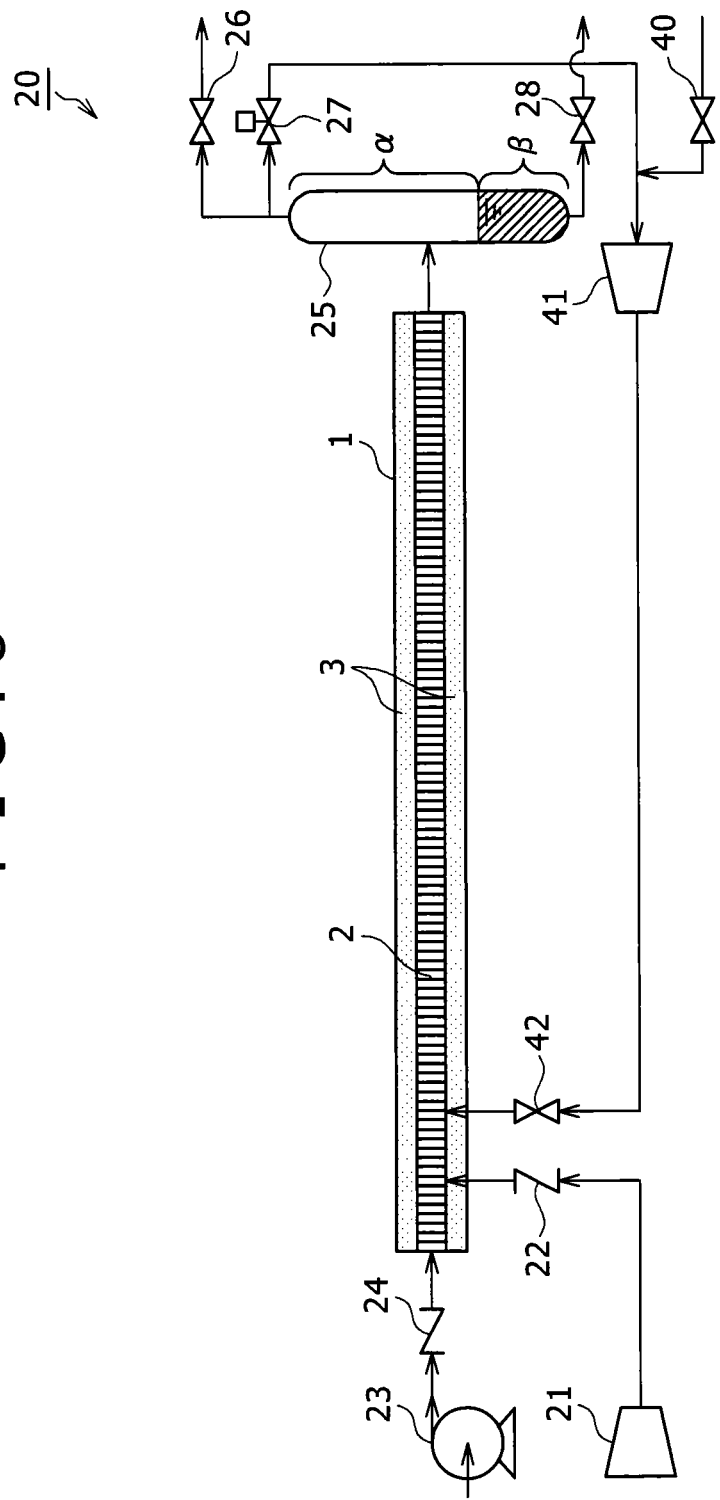

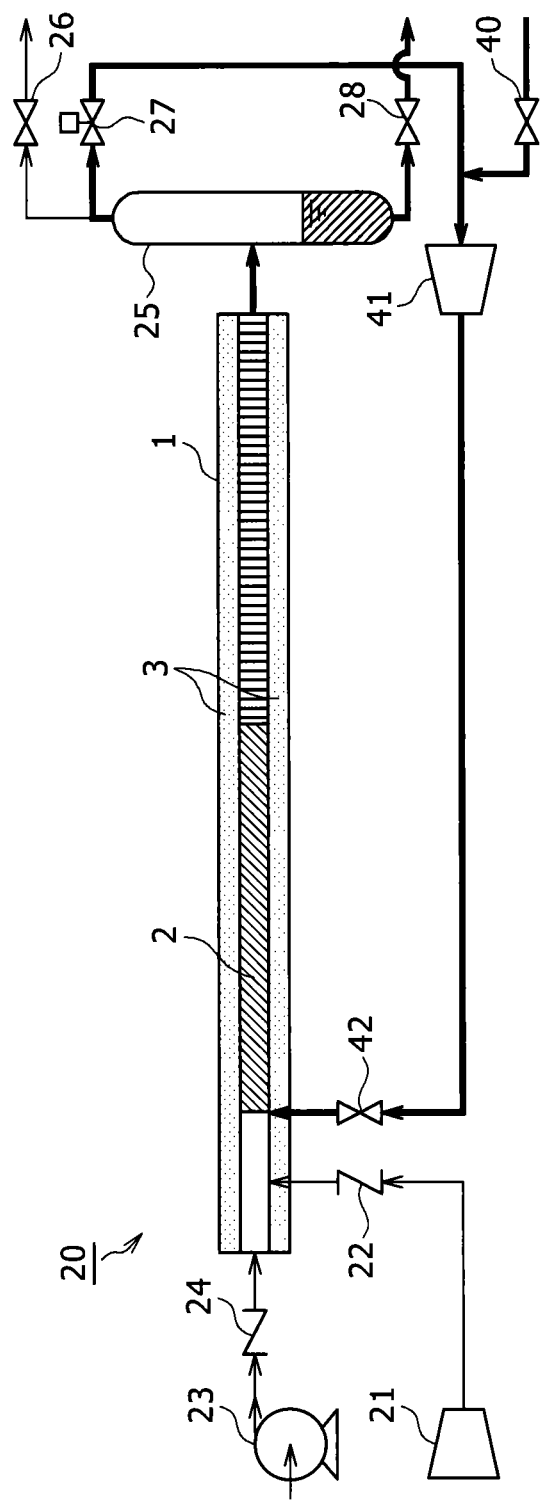

ABSORPTION METHOD AND ABSORPTION DEVICE

TECHNICAL FIELD

The present invention relates to an absorption method and an absorption device.

BACKGROUND ART

An absorption operation is one of methods for separating a specific component from a gas. The absorption operation method can be generally classified into a method that involves dispersing an absorbing liquid in a gas and a method that involves dispersing a gas in an absorbing liquid. In the former method, absorption towers such as a packed tower and a spray tower are used, while in the latter method, absorption towers such as a plate tower and a bubble tower are used. It is noted that such absorption towers are also known techniques disclosed in patent publication (e.g., see Patent Documents 1 and 2).

However, absorption devices such as absorption towers described above have a poor contact efficiency between an absorbing liquid and a gas. Hence, an absorption rate was low and it was difficult to increase an absorption amount per unit volume of an absorbing liquid.

CITATION LIST

Patent Document

Patent Document 1: JP Sho. 52-054680 A
Patent Document 1: JP Sho. 63-170206 A

SUMMARY OF THE INVENTION

It is an object of the present invention that, when a specific component in a gas is absorbed by an absorbing liquid, an absorption rate becomes higher and an absorption amount per unit volume of the absorbing liquid is increased.

An absorption method according to one aspect of the present invention comprises: a step for preparing a minute passage; a main circulation step for circulating, as a first fluid, a gas containing a component to be absorbed and an absorbing liquid as a second fluid in the minute passage, thereby absorbing the component to be absorbed in the gas by the absorbing liquid; and a sub-circulation step for circulating a third fluid in the minute passage, thereby increasing a pressure inside of the minute passage in a state that the gas and the absorbing liquid are circulated in the minute passage.

An absorption device according to another aspect of the present invention comprises: a first supply part for supplying, as a first fluid, a gas containing a component to be absorbed; a second supply part for supplying an absorbing liquid as a second fluid; a minute passage for circulating the gas supplied from the first supply part and the absorbing liquid supplied from the second supply part, thereby absorbing the component to be absorbed in the gas by the absorbing liquid; and a third supply part for supplying a third fluid to the minute passage to increase a pressure inside of the minute passage.

BRIEF DESCRIPTION OF DRAWINGS

FIG. 2A is a diagram showing one example of fluid passages inside of the minute passage device of the present embodiments.

FIG. 2B is a diagram of a substrate forming the fluid passages shown as one example of the present embodiments, viewing from a front side.

FIG. 2C is a diagram of the substrate forming the fluid passages shown as one example of the present embodiments, viewing from a rear side.

FIG. 2D is a diagram showing another example of fluid passages inside of the minute passage device of the present embodiments.

FIG. 2E is a diagram of a substrate forming the fluid passages shown as another example of the present embodiments, viewing from a front side.

FIG. 2F is a diagram of the substrate forming the fluid passages shown as another example of the present embodiments, viewing from a rear side.

FIG. 3 is a diagram showing temperature controlling passages inside of the minute passage device of the present embodiments.

FIG. 4 is a partial cross-sectional view of the minute passage device of the present embodiment, taken at a first end face.

FIG. 5 is a diagram showing a configuration of an absorption device according to a first embodiment.

FIG. 8 is a diagram showing a configuration of an absorption device according to a second embodiment.

FIG. 10B is a diagram showing, in the absorption device according the second embodiment, operations of the absorption device when supply of the third fluid to the fluid passage is performed.

DESCRIPTION OF EMBODIMENTS

Hereinafter, embodiments of the present invention will be described with reference to the drawings.

First, a minute passage device used in the present embodiments will be described. The minute passage device of the present embodiments is used in an absorption method (absorption operation), in which a specific component in a gas as a first fluid is absorbed by an absorbing liquid as a second fluid. That is, the minute passage device is used as an absorption device. It is noted that the minute passage device can be used for making a plurality of fluids join together and generating interaction between the fluids, other than the absorption operation. For example, the minute passage device can be used as a microreactor, a heat exchanger, a reaction device for an extracting reaction, a mixing device for emulsifying, and the like.

Figure 1:
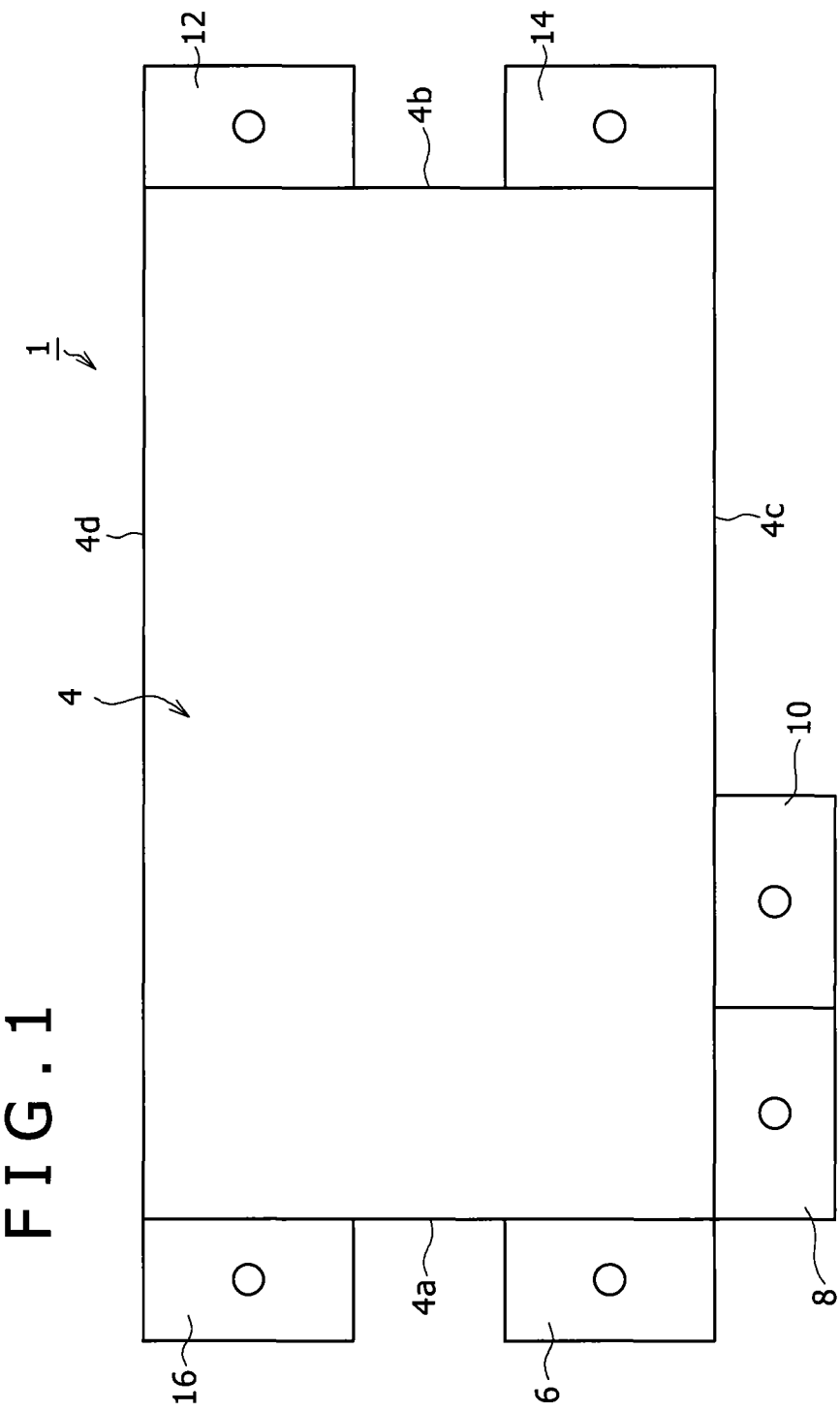
FIG. 1 is a diagram showing a configuration of a minute passage device of the present embodiments.

FIG. 1 is a diagram showing a configuration of a minute passage device 1 according to the present embodiments.

As shown in FIG. 1, the minute passage device 1 according to the present embodiments comprises a body part 4, a first fluid header 6, a second fluid header 8, a third fluid header 10, a fluid discharging header 12, and headers 14 and 16 for temperature controlling fluid.

The body part 4 occupying most of the minute passage device 1 is formed in a rectangular shape. The body part 4 comprises a first end face 4a, a second end face 4b, a third end face 4c, and a fourth end face 4d. The first end face 4a is an end face facing to one side in a longitudinal direction of the body part 4. The second end face 4b is an end face of the body part 4, facing an opposite side of the first end face 4a. The third end face 4c is an end face facing to one side in a short-side direction orthogonal to the longitudinal direction of the body part 4. The fourth end face 4c is an end face of the body part 4, facing an opposite side of the third end face 4c. The longitudinal direction of the body part 4 corresponds to a longitudinal direction of the minute passage device 1. The short-side direction of the body part 4 corresponds to a short-side direction of the minute passage device 1. A thickness direction of the body part 4 corresponds to a thickness direction of the minute passage device 1.

The first fluid header 6 and the header 16 for temperature controlling fluid are arranged so as to be opposed to the first end face 4a of the body part 4 and connected to the body part 4. The fluid discharging header 12 and the header 14 for temperature controlling fluid are arranged so as to be opposed to the second end face 4b of the body part 4 and connected to the body part 4. The second fluid header 8 and the third fluid header 10 are arranged so as to be opposed to the third end face 4c of the body part 4 and connected to the body part 4. The third fluid header 10 is arranged in a position more distant from the first end face 4a than the second fluid header 8.

Further, in the minute passage device 1 according to the present embodiments, a plurality of fluid passages 2 and a plurality of temperature controlling passages 3 are formed. Each of the fluid passages 2 is a passage for making the first fluid, the second fluid, and the third fluid join together and circulating them as a confluent flow. The first fluid and the second fluid are fluids for generating interaction between each other. In each of the fluid passages 2, the first fluid and the second fluid are circulated in a mutually contacted state, whereby a component to be absorbed in the first fluid is absorbed by the second fluid. Each of the temperature controlling passages 3 is a passage for circulating a temperature controlling fluid in order to adjust temperature of the fluids circulating in the fluid passages 2. Here, the fluid passages 2 and the temperature controlling passages 3 will be described.

FIG. 2A is a diagram showing one example of fluid passages 2 inside of the minute passage device 1 of the present embodiments.

Each of the fluid passages 2 is what is called a microchannel having a micro passage diameter. Each of the fluid passages 2 is an example of the minute passage. As shown in FIG. 2A, the fluid passages 2 comprise a first introduction passage 2a, a second introduction passage 2b, a third introduction passage 2c, and a confluent fluid passage 2d. The first introduction passage 2a is a part to which the first fluid is introduced. The second introduction passage 2b is a part to which the second fluid is introduced. The third introduction passage 2c is a part to which the third fluid is introduced. The confluent fluid passage 2d is a part, in which the fluids, each introduced from the corresponding first, second, and third introduction passages, are made to join and circulated.

The first introduction passage 2a is arranged at a position, which is near the first end face 4a and is also closer to the third end face 4c in the body part 4. The first introduction passage 2a is extended straight along the longitudinal direction of the body part 4. The first introduction passage 2a includes a first introduction port 2e for introducing the first fluid into the first introduction passage 2a.

The second introduction passage 2b is arranged at a position closer to the third end face 4c in the body part 4. The second introduction passage 2b is extended straight from the third end face 4c to the fourth end face 4d along the short-side direction of the body part 4. The second introduction passage 2b is extended in a direction orthogonal to the first introduction passage 2a. Further, the second introduction passage 2b includes a second introduction port 2f for introducing the second fluid into the second introduction passage 2b.

The third introduction passage 2c is also arranged at a position closer to the third end face 4c in the body part 4. The third introduction passage 2c is extended straight from the third end face 4c to the fourth end face 4d along the short-side direction of the body part 4. The third introduction passage 2c is also extended in the direction orthogonal to the first introduction passage 2a. However, the third introduction passage 2c is arranged in a position more distant from the first end face 4a in the body part 4 than the second introduction passage 2b. Further, the third introduction passage 2c includes a third introduction port 2g for introducing the third fluid into the third introduction passage 2c.

The confluent fluid passage 2d is formed in a meandering shape, in which a linear part extending to the first end face 4a in the longitudinal direction of the body part 4 and a linear part extending to the second end face 4b, formed by folding back the former linear part, are alternately connected. Specifically, the confluent fluid passage 2d comprises a plurality of linear passage parts 2h, a plurality of first folded parts 2i, and a plurality of second folded parts 2j.

In the confluent fluid passage 2d, the linear passage parts 2h constitute linear parts extending in the longitudinal direction of the body part 4. The plurality of the linear passage parts 2h are arranged in parallel with one another. The plurality of the linear passage parts 2h are arranged so as to be aligned with one another with an interval in the short-side direction of the body part 4.

The first folded parts 2i in the confluent fluid passage 2d are parts for connecting between end parts, located at a first end face 4a side, of the linear parts extending to the first end face 4a side in the longitudinal direction of the body part 4, and end parts, located at the first end face 4a side, of the linear parts extending to the second end face 4b side, arranged at a downstream side of the former linear parts. That is, the first folded parts 2i connect together the end parts, located at the first end face 4a side, of the linear passage parts 2h adjacent to each other in the short-side direction of the body part 4. By the first folded parts 2i, the passages are folded back from the linear passage parts 2h, which are located at an upstream side of the first folded parts 2i and extending to the first end face 4a side, to the linear passage parts 2h, which are located at a downstream side of the first folded parts 2i and extending to the second end face 4b side.

The second folded parts 2j in the confluent fluid passage 2d are parts for connecting between end parts, located at a second end face 4b side, of the linear parts extending to the second end face 4b side in the longitudinal direction of the body part 4, and end parts, located at the second end face 4b side, of the linear parts extending to the first end face 4a side, arranged at a downstream side of the former linear parts. That is, the second folded parts 2j connect together the end parts, located at the second end face 4b side, of the linear passage parts 2h adjacent to each other in the short-side direction of the body part 4. By the second folded parts 2j, the passage is folded back from the linear passage parts 2h, which are located at an upstream side of the second folded parts 2j and extending to the second end face 4b side, to the linear passage parts 2h, which are located at a downstream side of the second folded parts 2j and extending to the first end face 4a side.

Further, the confluent fluid passage 2d includes a lead out port 2k for leading out the fluids from the confluent fluid passage 2d. The lead out port 2k is arranged at a downstream end part of the confluent fluid passage 2d.

Further, in the minute passage device 1, a first supply passage 2m, a second supply passage 2n, a third supply passage 2o, and a recover passage 2p are formed. Specifically, the first supply passage 2m is formed in the first fluid header 6. The second supply passage 2n is formed in the second fluid header 8. The third supply passage 2o is formed in the third fluid header 10. The recover passage 2p is formed in the fluid discharging header 12.

The first supply passage 2m is for distributively supplying the first fluid to the first introduction port 2e of the first introduction passage 2a in each of the fluid passages 2. The first supply passage 2m includes a first supply hole 2q and a first supply passage connection part 2r. The first supply hole 2q is opened at one end face (referred to as a fifth end face) in a thickness direction of the minute passage device 1. The first supply hole 2q is extended from the opening thereof toward the other end face (referred to as a sixth end face) in the thickness direction of the minute passage device 1 up to a position corresponding to a fluid passage 2 closest to the sixth end face among the plurality of the fluid passages 2. The first supply hole 2q is connected to a first supply-side connector not illustrated. The first fluid is supplied to the first supply hole 2q via the first supply-side connector. The first supply passage connection part 2r is extended in the thickness direction of the minute passage device 1 from a position corresponding to a fluid passage 2 closest to the fifth end face of the minute passage device 1 to the position corresponding to the fluid passages 2 closest to the six end face, among the plurality of the fluid passages 2. The first supply passage connection part 2r is formed so as to communicate with the first supply hole 2q. The first supply passage connection part 2r is connected to the first introduction port 2e in each of the fluid passages 2. The first supply passage connection part 2r distributes the first fluid supplied to the first supply hole 2q to each of the first introduction ports 2e.

The second supply passage 2n is for distributively supplying the second fluid to the second introduction port 2f of the second introduction passage 2b in each of the fluid passages 2. The second supply passage 2n includes a second supply hole 2s connected to a second supply-side connector not illustrated, and a second supply passage connection part 2t connected to the second introduction port 2f in each of the fluid passages 2. The second supply hole 2s and the second supply passage connection part 2t of the second supply passage 2n have the same configuration as the first supply hole 2q and the first supply passage connection part 2r of the first supply passage 2m, respectively.

The third supply passage 2o is for distributively supplying the third fluid to the third introduction port 2g of the third introduction passage 2c in each of the fluid passages 2. The third supply passage 2o includes a third supply hole 2u connected to a third supply-side connector not illustrated, and a third supply passage connection part 2v connected to the third introduction port 2g in each of the fluid passages 2. The third supply hole 2u and the third supply passage connection part 2v of the third supply passage 2o also have the same configuration as the first supply hole 2q and the first supply passage connection part 2r of the first supply passage 2m, respectively.

The recover passage 2p is for combining together and recovering the fluids led out from the lead out port 2k of the confluent fluid passage 2d in each of the fluid passages 2. The recover passage 2p includes a recovery hole 2w and a recovery passage connection part 2x. The recovery hole 2w is opened at the fifth end face of the minute passage device 1. The recovery hole 2w is extended from the opening thereof toward the sixth end face of the minute passage device 1 up to a position corresponding to the fluid passage 2 closest to the sixth end face among the plurality of the fluid passages 2. The recovery hole 2w is connected to a recovery-side connector not illustrated. The recovery passage connection part 2x is extended in the thickness direction of the minute passage device 1 from a position corresponding to the fluid passage 2 closest to the fifth end face of the minute passage device 1 to a position corresponding to the fluid passage 2 closest to the six end face, among the plurality of the fluid passages 2. The recovery passage connection part 2x is formed so as to communicate with the recovery hole 2w. The recovery passage connection part 2x is connected to the lead out port 2k in each of the fluid passages 2. The recovery passage connection part 2x combines together the fluids led out from each of the lead out ports 2k. The fluids combined together at the recovery passage connection part 2x are allowed to flow into the recovery hole 2w and led out via the recovery-side connector not illustrated.

It is noted that, in FIG. 2A, the first introduction passage 2a and the confluent fluid passage 2d, and the second introduction passage 2b and the third introduction passage 2c are shown on the same plane. However, in reality, the position of confluent fluid passage 2d is different from those of the second introduction passage 2b and the third introduction passage 2c in the thickness direction of the body part 4 of the minute passage device 1. The body part 4 is, as described below, formed by laminating a plurality of substrates. A laminating direction of the substrates corresponds to the thickness direction of the minute passage device 1 and the body part 4. The plurality of the substrates constituting the body part 4 include substrates forming the fluid passages 2.

FIG. 2B is a diagram of the substrate forming the fluid passage 2, viewing from a front side. FIG. 2C is a diagram of the substrate shown in FIG. 2B, viewing from a rear side at the opposite side of the front side. The first introduction passage 2a and the confluent fluid passage 2d are, as indicated by a solid line in FIG. 2B and by a broken line in FIG. 2C, on the front surface side of the substrate forming the fluid passage 2. On the other hand, the second introduction passage 2b and the third introduction passage 2c are, as indicated by a broken line in FIG. 2B and by a solid line in FIG. 2C, on the rear surface side of the substrate forming the fluid passage 2.

FIG. 2D is a diagram showing another example of a fluid passage 2 inside of the minute passage device 1 of the present embodiments.

The fluid passage 2, as shown in the drawing, has such a configuration that five sets of the first introduction passage 2a, the second introduction passage 2b, the third introduction passage 2c, the confluent fluid passage 2d, the first introduction port 2e, the second introduction port 2f, the third introduction port 2g, the linear passage parts 2h, the first folded parts 2i, the second folded parts 2j, and the lead out port 2k, each shown in FIG. 2A, are arranged in parallel in the body part 4. It is noted that the number of the sets arranged in parallel is five in this configuration, however the number of the sets may be any number. Further, in the first fluid header 6, the first supply passage 2m is commonly provided for the five sets arranged in parallel. Further, in the second fluid header 8, the second supply passage 2n is commonly provided for the five sets arranged in parallel. Further, in the third fluid header 10, the third supply passage 2o is commonly provided for the five sets arranged in parallel. Further, in the fluid discharging header 12, the recover passage 2p is commonly provided for the five sets arranged in parallel. The functions of the first supply passage 2m, the second supply passage 2n, the third supply passage 2o, and the recover passage 2p are the same as those of the corresponding passages shown in FIG. 2A. It is noted that each of the structural elements is explained above with reference to FIG. 2A, thus, detailed explanation thereon is omitted here.

Also in FIG. 2D, the first introduction passage 2a and the confluent fluid passage 2d, and the second introduction passage 2b and the third introduction passage 2c are shown on the same plane. However, in reality, the positions of the first introduction passage 2a and the confluent fluid passage 2d are different from those of the second introduction passage 2b and the third introduction passage 2c in the thickness direction of the body part 4 of the minute passage device 1.

FIG. 2E is a diagram of one substrate forming the fluid passage 2 among the plurality of substrates constituting the body part 4, viewing from a front side. FIG. 2F is a diagram of the substrate shown in FIG. 2E, viewing from a rear side at the opposite side of the front side. The first introduction passage 2a and the confluent fluid passage 2d are, as indicated by a solid line in FIG. 2E and by a broken line in FIG. 2F, on the front surface side of the substrate forming the fluid passage 2. On the other hand, the second introduction passage 2b and the third introduction passage 2c are, as indicated by a broken line in FIG. 2E and by a solid line in FIG. 2F, on the rear surface side of the substrate forming the fluid passage 2.

FIG. 3 is a diagram showing the temperature controlling passages 3 inside of the minute passage device 1 of the present embodiments.

As shown in FIG. 3, each of the temperature controlling passages 3 consists of a plurality of unit passages 3a arranged in parallel. Each of the unit passages 3a is formed in a meandering shape, in which a part extending to the first end face 4a in the longitudinal direction of the body part 4 and a part extending to the second end face 4b, formed by folding back the former part, are alternately connected. Further, in the minute passage device 1, a supply passage 3b for temperature control and a recovery passage 3c for temperature control are formed.

The supply passage 3b for temperature control is for distributively supplying the temperature controlling fluid to each of the temperature controlling passages 3. The supply passage 3b for temperature control is formed in the header 14 for temperature controlling fluid. The supply passage 3b for temperature control includes a supply hole 3d for temperature control and a plurality of supply passage connection parts 3e for temperature control. The supply hole 3d for temperature control is opened at one end face (the fifth end face) in the thickness direction of the minute passage device 1. The supply hole 3d for temperature control is extended from the opening thereof toward the other end face (the sixth end face) in the thickness direction of the minute passage device 1 up to a position corresponding to a temperature controlling passage 3 closest to the sixth end face among the plurality of the temperature controlling passages 3. The supply hole 3d for temperature control is connected to a supply-side connector for temperature control not illustrated. The temperature controlling fluid is supplied to the supply hole 3d for temperature control via the supply-side connector for temperature control. The supply passage connection parts 3e for temperature control are each formed at a position corresponding to each of the temperature controlling passages 3 in the thickness direction of the minute passage device 1. The supply passage connection parts 3e for temperature control connect the supply hole 3d for temperature control and upstream end parts of the plurality of the unit passages 3a in each of the temperature controlling passages 3. The temperature controlling fluid supplied to the supply hole 3d for temperature control is distributed to the plurality of the unit passages 3a in each of the temperature controlling passages 3 via each of the supply passage connection parts 3e for temperature control.

Further, the recovery passage 3c for temperature control is for recovering the temperature controlling fluid from each of the temperature controlling passages 3. The recovery passage 3c for temperature control is formed in the header 16 for temperature controlling fluid. The recovery passage 3c for temperature control includes a recovery hole 3f for temperature control and a plurality of recovery passage connection parts 3g for temperature control connected to downstream end parts of the plurality of the temperature controlling passages 3. The recovery hole 3f for temperature control and the recovery passage connection parts 3g for temperature control have the same structures as the supply hole 3d for temperature control and the supply passage connection parts 3e for temperature control, respectively. The recovery hole 3f for temperature control is connected to a recovery-side connector for temperature control not illustrated. The temperature controlling fluid led out from downstream end parts of the plurality of the unit passages 3a in each of the temperature controlling passages 3 is allowed to flow from each of the recovery passage connection parts 3g for temperature control to the recovery hole 3f for temperature control, and then lead out via the recovery-side connector for temperature control.

Then, the plurality of the fluid passages 2 and the plurality of the temperature controlling passages 3 are arranged in the minute passage device 1 so as to be aligned side by side in the thickness direction of the minute passage device 1. Specifically, each part of a single fluid passage 2 is arranged on one plane. Two temperature controlling passages 3 are disposed separately on both sides of this fluid passage 2 in the thickness direction of the minute passage device 1 (a direction vertical to the one plane). Thus, one set of passages is formed by the one fluid passage 2 and the two temperature controlling passages 3 and, then, a plurality of the passage sets are arranged side by side in the thickness direction of the minute passage device 1.

FIG. 4 is a diagram showing a part of a cross section of an arbitrary plane in parallel to the first end face 4a of the minute passage device 1 of the present embodiments, excluding folded parts of the fluid passages 2 and the temperature controlling passages 3. FIG. 4 shows arrangements, in the thickness direction, of the fluid passages 2 and the temperature controlling passages 3 in the minute passage device 1.

As shown in FIG. 4, a plurality of the confluent fluid passages 2d of the fluid passages 2 are arranged side by side in a lateral direction in the body part 4. Further, as shown in FIG. 4, in the body part 4, a plurality of the unit passages 3a of the temperature controlling passages 3 are arranged with an interval on one side or the other side of the fluid passages 2 in the thickness direction of the body part 4.

The body part 4 is formed from a member, in which a plurality of substrates are laminated and joined together. Each of the fluid passages 2 is formed in such a manner that groove parts formed on a substrate surface into a shape corresponding to the fluid passages 2 are sealed with another substrate laminated on the former substrate. Further, each of the temperature controlling passages 3 is formed in such a manner that groove parts formed on a substrate surface into a shape corresponding to the temperature controlling passages 3 are sealed with another substrate laminated on the former substrate. It is noted that, in FIG. 4, each of the fluid passages 2 and the temperature controlling passages 3 is formed to have a semicircular cross section with a circular arc at its lower side, however the shape is not limited thereto. For example, each of the fluid passages 2 and the temperature controlling passages 3 may be formed to have a semicircular cross section with a circular arc at its upper side. Further, each of the fluid passages 2 may be formed to have a circular cross section by joining together first groove parts formed into a shape corresponding to the fluid passages 2 on a front surface of a first substrate, and second groove parts formed into a shape symmetric to the first groove parts on a rear surface of a second substrate to be laminated on the first substrate. Further, each of the temperature controlling passages 3 may be formed to have a circular cross section by joining together third groove parts formed into a shape corresponding to the temperature controlling passages 3 on a front surface of a third substrate, and fourth groove parts formed into a shape symmetric to the third groove parts on a rear surface of a fourth substrate to be laminated on the third substrate.

Now, in the absorption method of the present embodiments, there is performed an absorption operation, in which a specific component to be absorbed in a gas is absorbed by an absorbing liquid using the minute passage device 1 described above. Specifically, a gas is circulated from the first supply hole 2q to the fluid passages 2, while an absorbing liquid is circulated from the second supply hole 2s to the fluid passages 2, and at the same time, cooling medium is circulated in the temperature controlling passages 3, thereby performing the absorption operation.

With this method, the absorption operation for absorbing a specific component in a gas by an absorbing liquid can be performed while the gas and the absorbing liquid are circulated in a minute passage in a mutually contacted state. Thus, a gas-liquid contact area becomes larger as compared to an absorption operation by a conventional absorption device, and, as a result, an absorption rate becomes higher. Further, by controlling temperature inside of the fluid passages 2 by circulating the cooling medium into the temperature controlling passages 3, a temperature rise caused by absorption heat can be suppressed, thereby preventing reduction of an absorption amount, and what is more, the absorption heat can be recovered and effectively utilized.

Moreover, in the present embodiments, the third fluid is supplied from the third supply hole 2u to the fluid passages 2, in which the gas as the first fluid and the absorbing liquid as the second fluid are circulated.

With this method, a pressure inside of the fluid passages 2 can be increased. Thus, the absorption amount per unit volume of the absorbing liquid is increased, thereby making the absorption rate higher. Further, in this case, the gas is compressed inside of the fluid passages 2, which leads to generate compression heat in addition to the absorption heat caused by absorption in the fluid passages 2. Therefore, more heat can be recovered as compared to a case, where the gas is compressed before being supplied to the fluid passages 2.

In this method, there are two cases to be considered, namely that the third fluid is in a liquid state and that the third fluid is in a gaseous state. Therefore, a first embodiment includes the former case where the third fluid is in a liquid state and a second embodiment includes the latter case where the third fluid is in a gaseous, and both embodiments will be described in detail below.

First Embodiment

In the first embodiment, a third fluid in a liquid state is supplied to the fluid passages 2 forming a gas-liquid two-phase flow. Here, it is preferred that the third fluid is insoluble and inactive to a gas as a first fluid and an absorbing liquid as a second fluid. However, this is not meant to exclude that the third fluid is soluble or active to the gas as the first fluid and the absorbing liquid as the second fluid. For example, when the first fluid is a carbon dioxide-containing gas and the second fluid is water, the third fluid may be decane, dodecane, hexadecane and the like. Alternatively, when the first fluid is a carbon dioxide-containing gas and the second fluid is an absorbing liquid composed of mainly an amine compound, the third fluid may also be decane, dodecane, hexadecane and the like.

FIG. 5 is a diagram showing a configuration of an absorption device 20 according to the first embodiment. The absorption device 20 according to the first embodiment comprises the minute passage device 1, which includes the fluid passages 2 and the temperature controlling passages 3 described with reference to FIG. 1 to FIG. 4. In FIG. 5, a state of circulating only the gas as the first fluid and the absorbing liquid as the second fluid in the fluid passage 2 is represented as a vertical striped pattern. It is noted that, in the minute passage device 1, as shown in FIG. 4, a plurality of layers, each containing the fluid passage 2 and the vertically adjacent temperature controlling passages 3, are laminated, however in FIG. 5, only a single layer containing the fluid passage 2 and the vertically adjacent temperature controlling passages 3 is schematically shown for the purpose of simplifying the description. Further, in reality, the minute passage device 1 is connected to a mechanism by which a temperature controlling fluid is supplied to temperature controlling passages 3 and a mechanism by which the temperature controlling fluid is recovered from the temperature controlling passages 3, however, illustration of these mechanisms is omitted in FIG. 5.

The absorption device 20 comprises a compressor 21, a check valve 22, a liquid pump 23, and a check valve 24. The compressor 21 is connected to the first supply hole 2q of the minute passage device 1 via the check valve 22. The liquid pump 23 is connected to the second supply hole 2s of the minute passage device 1 via the check valve 24.

Further, the absorption device 20 comprises a gas-liquid separator 25, a gate valve 26, a back pressure valve 27, a gate valve 28, a liquid pump 31, and a gate valve 32. The gas-liquid separator 25 is connected to the recovery hole 2w of the minute passage device 1. The gate valve 26, the back pressure valve 27, the gate valve 28, and the liquid pump 31 are each connected to the gas-liquid separator 25. The liquid pump 31 is connected to the third supply hole 2u of the minute passage device 1 via the gate valve 32.

The compressor 21 compresses a gas supplied from a gas supply source not illustrated. The compressor 21 circulates the compressed gas from the first supply hole 2q to the fluid passages 2 of the minute passage device 1 via the check valve 22. In the first embodiment, the compressor 21 is provided as an example of a first supply part. Here, as the compressor 21, a screw type displacement compressor for compressing a gas by rotating a screw rotor, a reciprocating displacement compressor for compressing a gas by a reciprocation motion of a piston, or the like may be used. Further, as the compressor 21, a turbo type centrifugal compressor for compressing a gas by centrifugal force obtained by the rotation of an impeller, or the like may be used. The check valve 22 is provided to prevent a backflow of the third fluid to the compressor 21 when the third fluid is circulated in the fluid passages 2 as described below.

The liquid pump 23 inhales and exhales the absorbing liquid supplied from an absorbing liquid supply source not illustrated, thereby circulating the absorbing liquid from the second supply hole 2s to the fluid passages 2 of the minute passage device 1 via the check valve 24. In the first embodiment, the liquid pump 23 is provided as an example of a second supply part. Here, as the liquid pump 23, a rotary type displacement pump for inhaling and exhaling an absorbing liquid by the rotary motion of a rotor and a gear, a reciprocating type displacement pump for inhaling and exhaling an absorbing liquid by the reciprocating motion of a piston and a plunger, or the like may be used. Further, as the liquid pump 23, a centrifugal type turbo pump for inhaling and exhaling an absorbing liquid by centrifugal force obtained by the rotation of an impeller, or the like may be used. The check valve 24 is provided to prevent a backflow of the third fluid to the liquid pump 23 when the third fluid is circulated in the fluid passages 2 as described below.

The gas-liquid separator 25 temporally stores an off-gas and the absorbing liquid discharged from the recovery hole 2w of the minute passage device 1. The off-gas stored in the gas-liquid separator 25 is a remaining gas after a specific component in the gas circulated into the fluid passage 2 by the compressor 21 is absorbed by the absorbing liquid circulated into the fluid passage 2 by the liquid pump 23. The gas-liquid separator 25 temporally stores the off-gas in a part α shown in FIG. 5, located in the middle to upper part in a vertical direction in the gas-liquid separator 25. In this embodiment, the specific component in the gas is considered as a desired component and the remaining gas after the specific component is absorbed by the absorbing liquid is referred to as an off-gas. However, the specific component in the gas may be an unnecessary component and the gas after the specific component is absorbed by the absorbing liquid may be a desired component. On the other hand, the absorbing liquid stored in the gas-liquid separator 25 is a liquid after the absorbing liquid circulated into the fluid passage 2 by the liquid pump 23 absorbs a specific component in the gas circulated into the fluid passage 2 by the compressor 21. The gas-liquid separator 25 temporally stores the absorbing liquid in a part β shown in FIG. 5, located in the lower part in the gas-liquid separator 25. Then, the gas-liquid separator 25 separates the temporally stored off-gas and absorbing liquid. Specifically, the gas-liquid separator 25 discharges the off-gas via the gate valve 26 or the back pressure valve 27. The gate valve 26 is provided to perform control of discharging the off-gas. The back pressure valve 27 is provided to perform control of discharging the off-gas when a pressure inside of the gas-liquid separator 25 is increased and reaches a specific pressure. On the other hand, the gas-liquid separator 25 discharges the absorbing liquid via the gate valve 28. The gate valve 28 is provided to perform control of discharging the absorbing liquid.

Further, in the first embodiment, the gas-liquid separator 25 also temporally stores the third fluid. A fluid used as the third fluid is insoluble and inactive to the off-gas and the absorbing liquid and has a lower specific gravity than the absorbing liquid. Thus, the gas-liquid separator 25 stores the third fluid in a part γ shown in FIG. 5, interposed between the part α storing the off-gas and the part β storing the absorbing liquid in the gas-liquid separator 25. Then the third fluid is supplied to the liquid pump 31 from the gas-liquid separator 25. The liquid pump 31 inhales and exhales the third fluid, thereby circulating the third fluid from the third supply hole 2u to the fluid passage 2 of the minute passage device 1 via the gate valve 32. In the first embodiment, the liquid pump 31 is provided as an example of a third supply part. Here, as the liquid pump 31, a rotary type displacement pump for inhaling and exhaling a third fluid by the rotary motion of a rotor and a gear, a reciprocating type displacement pump for inhaling and exhaling a third fluid by the reciprocating motion of a piston and a plunger, or the like may be used. Further, as the liquid pump 31, a centrifugal type turbo pump for inhaling and exhaling a third fluid by centrifugal force obtained by the rotation of an impeller, or the like may be used. The gate valve 32 is provided to perform control of circulating the third fluid into the fluid passage 2. When the third fluid has a greater specific gravity than the absorbing liquid, the third fluid is stored in the part β shown in FIG. 5, located in the lower part in the gas-liquid separator 25 and the absorbing liquid is stored in the part γ shown in FIG. 5, located in the upper side of the part β. If it is envisioned that this may be the case, the gate valve 28 is connected to the part γ in the gas-liquid separator 25, where the absorbing liquid is stored and the liquid pump 31 is connected to the part β in the gas-liquid separator 25, where the third fluid is stored.

Next, operations of the absorption device 20 according to the first embodiment and an absorption method according to the first embodiment using the absorption device 20 will be explained.

Figure 6:
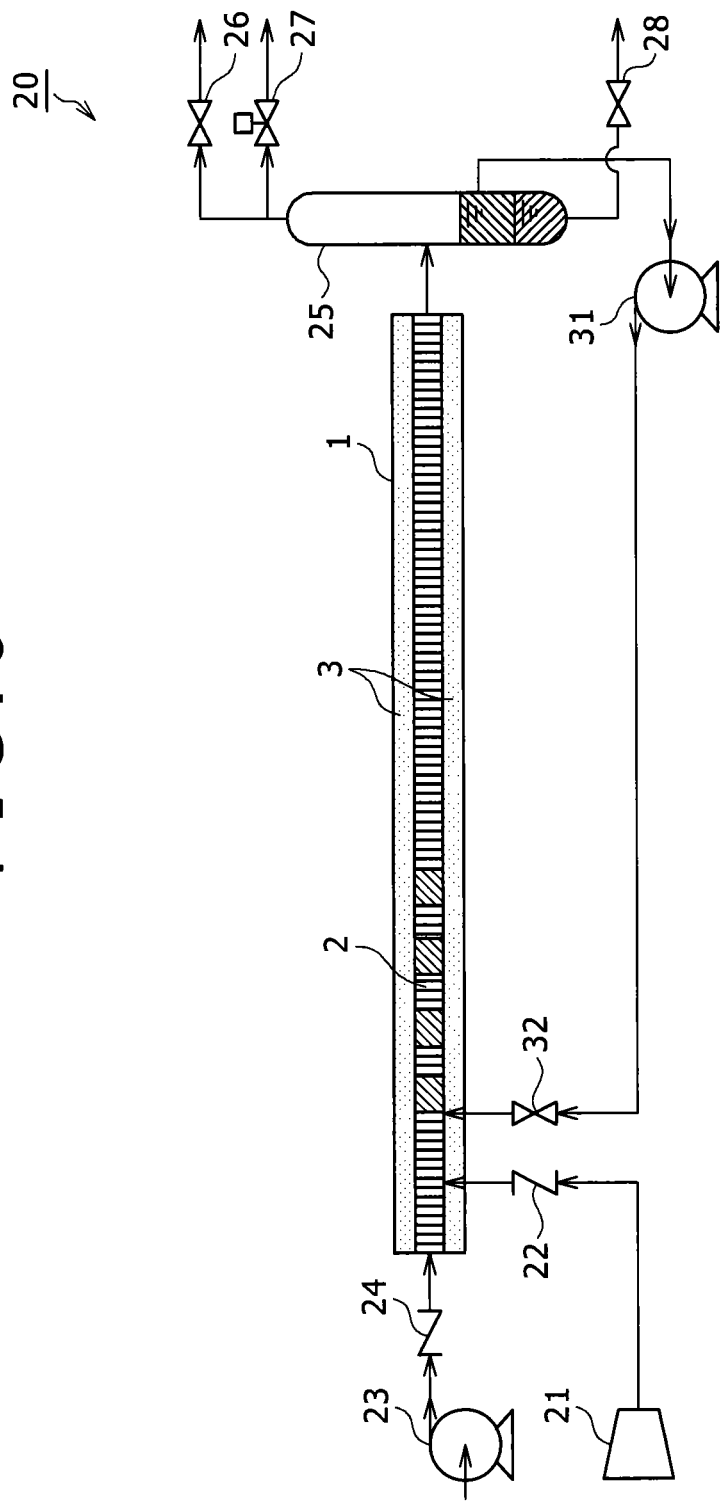
FIG. 6 is a diagram showing, in the absorption device according to the first embodiment, operations of the absorption device when supply of a first fluid and a second fluid to a fluid passage and supply of a third fluid to the fluid passage are simultaneously performed.

FIG. 6 is a diagram showing operations when supply of the gas as the first fluid and the absorbing liquid as the second fluid into the fluid passage 2 and supply of the third fluid into the fluid passage 2 are simultaneously performed.

In an example of the absorption method shown in FIG. 6, the compressor 21 supplies the gas to the fluid passage 2 and the liquid pump 23 supplies the absorbing liquid to the fluid passage 2, and at the same time, the liquid pump 31 supplies the third fluid to the fluid passage 2. That is, a main circulation step for circulating the gas and the absorbing liquid into the fluid passage 2 to absorb a specific component in the gas by the absorbing liquid, and a sub-circulation step for circulating the third fluid into the fluid passage 2 to increase a pressure inside of the fluid passage 2 are simultaneously performed. Thereby, the third fluid is supplied into the fluid passage 2, as represented by four small rectangles, where hatching is applied by oblique lines, in the fluid passage 2 in FIG. 6. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until a pressure inside of the fluid passage 2 is increased and reaches a specific pressure, and as a result, the pressure inside of the fluid passage 2 is increased to a high pressure. Thus, the absorption rate of a specific component in the gas by the absorbing liquid becomes higher. It is noted that the absorbing liquid discharged from the fluid passage 2 is temporally stored in the lower part in the gas-liquid separator 25. Further, the third fluid is also discharged from the fluid passage 2. If the third fluid is insoluble and inactive to the gas and the absorbing liquid and has a lower specific gravity than the absorbing liquid, the third fluid is temporally stored in a part interposed between the part storing the off-gas and the part storing the absorbing liquid in the gas-liquid separator 25. Then, the third fluid is supplied to the liquid pump 31 again. The liquid pump 31 circulates the third fluid into the fluid passage 2. By circulating the third fluid in this manner, the amount of the third fluid in use can be reduced.

Figure 7A:
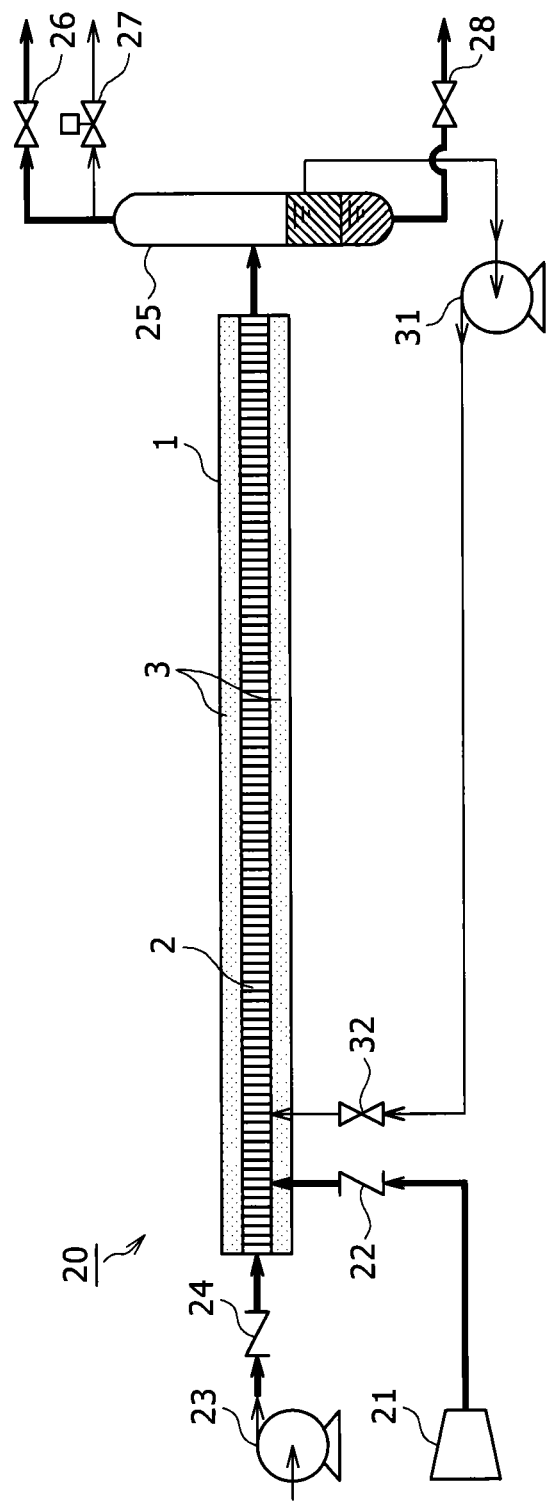
FIG. 7A is a diagram showing, in the absorption device according the first embodiment, operations of the absorption device when supply of the first fluid and the second fluid to the fluid passage is performed.
Figure 7B:
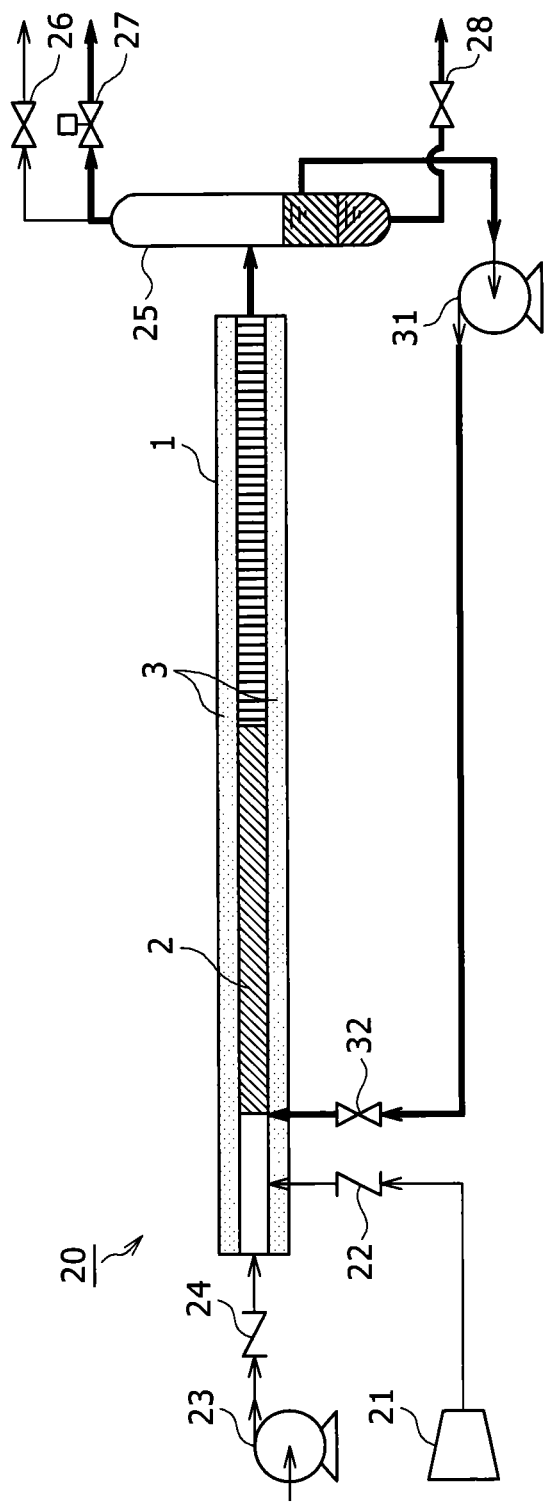
FIG. 7B is a diagram showing, in the absorption device according the first embodiment, operations of the absorption device when supply of the third fluid to the fluid passage is performed.

FIG. 7A and FIG. 7B are diagrams showing operations when supply of the gas as the first fluid and the absorbing liquid as the second fluid into the fluid passage 2 and supply of the third fluid into the fluid passage 2 are alternately performed. In FIG. 7A and FIG. 7B, bold arrows show that the fluids are flowing in the passages indicated by the arrows.

First, as shown in FIG. 7A, the compressor 21 supplies the gas to the fluid passage 2 and the liquid pump 23 supplies the absorbing liquid to the fluid passage 2. Thus, the main circulation step for circulating the gas and the absorbing liquid into the fluid passage 2 to absorb a specific component in the gas by the absorbing liquid is performed. In this step, the gate valve 26 is opened and the back pressure valve 27 is closed. By this operation, the off-gas discharged from the fluid passage 2 and temporally stored in the upper part in the gas-liquid separator 25 is discharged directly from the gate valve 26. Thus, the pressure inside of the fluid passage 2 is kept at a low pressure. It is noted that the absorbing liquid discharged from the fluid passage 2 is temporally stored in the lower part in the gas-liquid separator 25.

Next, as shown in FIG. 7B, the liquid pump 31 supplies the third fluid to the fluid passage 2. By this operation, the third fluid is supplied into the fluid passage 2, as represented by an elongated rectangular, where hatching is applied by oblique lines, in the fluid passage 2 in FIG. 7B. That is, the sub-circulation step for circulating the third fluid into the fluid passage 2 to increase the pressure inside of the fluid passage 2 is performed. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until the pressure inside of the fluid passage 2 is increased and reaches a specific pressure, and as the result, the pressure inside of the fluid passage 2 is increased to a high pressure. Thus, the absorption rate of a specific component in the gas by the absorbing liquid becomes higher. It is noted that the absorbing liquid discharged from the fluid passage 2 is temporally stored in the lower part in the gas-liquid separator 25. Further, the third fluid is also discharged from the fluid passage 2. If the third fluid is insoluble and inactive to the gas and the absorbing liquid and has a lower specific gravity than the absorbing liquid, the third fluid is temporally stored in a part interposed between the part storing the off-gas and the part storing the absorbing liquid in the gas-liquid separator 25. Then, the third fluid is supplied to the liquid pump 31 again. The liquid pump 31 circulates the third fluid into the fluid passage 2.

Subsequently, as shown in FIG. 7A, the compressor 21 supplies the gas to the fluid passage 2 and the liquid pump 23 supplies the absorbing liquid to the fluid passage 2 again. That is, the main circulation step is performed again. During this operation, the gate valve 26 is opened and the back pressure valve 27 is closed. By this operation, the off-gas discharged from the fluid passage 2 and temporally stored in the upper part in the gas-liquid separator 25 is discharged directly from the gate valve 26. Thus, the pressure inside of the fluid passage 2 is returned to a low pressure. It is noted that the absorbing liquid discharged from the fluid passage 2 is temporally stored in the lower part in the gas-liquid separator 25.

Next, as shown in FIG. 7B, the liquid pump 31 supplies the third fluid to the fluid passage 2. By this operation, the third fluid is supplied into the fluid passage 2, as represented by an elongated rectangular, where hatching is applied by oblique lines, in the fluid passage 2 in FIG. 7B. That is, the sub-circulation step is performed again. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until the pressure inside of the fluid passage 2 is increased and reaches a specific pressure, and as a result, the pressure inside of the fluid passage 2 is increased to a high pressure again. Thus, the absorption rate of a specific component in the gas by the absorbing liquid becomes higher again. It is noted that the absorbing liquid discharged from the fluid passage 2 is temporally stored in the lower part in the gas-liquid separator 25. Further, the third fluid is also discharged from the fluid passage 2. If the third fluid is insoluble and inactive to the gas and the absorbing liquid and has a lower specific gravity than the absorbing liquid, the third fluid is temporally stored in a part interposed between the part storing the off-gas and the part storing the absorbing liquid in the gas-liquid separator 25. Then, the third fluid is supplied to the liquid pump 31 again. The liquid pump 31 circulates the third fluid into the fluid passage 2.

Thereafter, the operations in FIG. 7A and the operations in FIG. 7B are repeated. It is noted that, in the operations described above, having a configuration, in which the off-gas directly passes through the gate valve 26, is an example for not applying a restriction to discharge of the off-gas. Further, having a configuration, in which, by the function of the back pressure valve 27, the off-gas is made hard to pass through the back pressure valve 27 until the pressure inside of the fluid passage 2 is increased and reaches a specific pressure, is an example for applying a restriction to discharge of the off-gas.

By performing semi-continuously the absorption operation for raising the pressure and increasing the absorption amount, as described above, the pressure inside of the fluid passage 2 can be increased and the absorption rate can become higher, as compared to a case where the third fluid is continuously supplied.

In the example of the absorption method shown in FIG. 7A and FIG. 7B, explanation is made on a case where supply of the gas as the first fluid and the absorbing liquid as the second fluid to a fluid passage 2 and supply of the third fluid to the same fluid passage 2 are alternately performed. However, supply of the gas as the first fluid and the absorbing liquid as the second fluid to a fluid passage 2 and supply of the third fluid to a fluid passage 2 can be simultaneously performed by using a plurality of the absorption devices 20. Specifically, a first absorption device 20 comprising a fluid passage 2 and a second absorption device 20, different from the first absorption device 20, comprising a fluid passage 2 are prepared. The fluid passage 2 of the first absorption device 20 is an example of a first minute passage of the present invention. The fluid passage 2 of the second absorption device 20 is an example of a second minute passage of the present invention. Then, the main circulation step shown in FIG. 7A and the sub-circulation step shown in FIG. 7B are alternately performed both in the fluid passage 2 of the first absorption device 20 and in the fluid passage 2 of the second absorption device 20. Then, when a pressure is raised in the fluid passage 2 in the second absorption device 20 as shown in FIG. 7B, the gas and the absorbing liquid are circulated into the fluid passage 2 in the first absorption device 20 as shown in FIG. 7A. That is, the main circulation step is performed in the fluid passage 2 of the first absorption device 20, while the sub-circulation step is performed in the fluid passage 2 of the second absorption device 20 at the same time. In this case, the process can be continued when the pressure is raised in the fluid passage 2.

Second Embodiment

In the second embodiment, a third fluid in a gas state is supplied to the fluid passages 2 forming a gas-liquid two-phase flow. Here, it is preferred that the third fluid is inactive to a gas as a first fluid and an absorbing liquid as a second fluid. However, this is not meant to exclude that the third fluid is active to the gas as the first fluid and the absorbing liquid as the second fluid. Further, the third fluid may be the same as a specific component, also considered as a desired component, in the gas. For example, when the first fluid is a carbon dioxide-containing gas and the second fluid is water, the third fluid may be nitrogen and the like. Alternatively, when the first fluid is a carbon dioxide-containing gas and the second fluid is an absorbing liquid composed of mainly an amine compound, the third fluid may also be nitrogen and the like. Following is explained in a case that the third fluid is so-called an inert gas.

FIG. 8 is a diagram showing a configuration of an absorption device 20 according to the second embodiment. The absorption device 20 according to the second embodiment comprises the minute passage device 1, which includes the fluid passages 2 and the temperature controlling passages 3 described with reference to FIG. 1 to FIG. 4. In FIG. 8, a state of circulating only the gas as the first fluid and the absorbing liquid as the second fluid in the fluid passages 2 is represented as a vertical striped pattern. It is noted that, in the minute passage device 1, as shown in FIG. 4, a plurality of layers, each containing the fluid passage 2 and the vertically adjacent temperature controlling passages 3, are laminated, however in FIG. 8, only a single layer containing the fluid passage 2 and the vertically adjacent temperature controlling passages 3 is schematically shown for the purpose of simplifying the description. Further, in reality, the minute passage device 1 is connected to a mechanism by which the temperature controlling fluid is supplied to the temperature controlling passages 3 and a mechanism by which the temperature controlling fluid is recovered from the temperature controlling passages 3, however, illustration of these mechanisms is omitted in FIG. 8.

The absorption device 20 comprises a compressor 21, a check valve 22, a liquid pump 23, and a check valve 24. The compressor 21 is connected to the first supply hole 2q of the minute passage device 1 via the check valve 22. The liquid pump 23 is connected to the second supply hole 2s of the minute passage device 1 via the check valve 24.

Further, the absorption device 20 comprises a gas-liquid separator 25, a gate valve 26, a back pressure valve 27, a gate valve 28, a gate valve 40, a compressor 41, and a gate valve 42. The gas-liquid separator 25 is connected to the recovery hole 2w of the minute passage device 1. The gate valve 26, the back pressure valve 27, and the gate valve 28 are each connected to the gas-liquid separator 25. The compressor 41 is connected to the back pressure valve 27. Further, the compressor 41 is connected, via the gate valve 40, to an inert gas supply source not illustrated. Further, the compressor 41 is connected, via the gate valve 42, to the third supply hole 2u of the minute passage device 1.

Configurations of the compressor 21, the check valve 22, the liquid pump 23, and the check valve 24 are described in the first embodiment, thus explanations thereof are omitted here.

The gas-liquid separator 25 temporally stores the off-gas and the absorbing liquid discharged from the recovery hole 2w of the minute passage device 1. The off-gas stored in the gas-liquid separator 25 is a remaining gas after a specific component in the gas circulated into the fluid passages 2 by the compressor 21 is absorbed by the absorbing liquid circulated into the fluid passages 2 by the liquid pump 23. The gas-liquid separator 25 temporally stores the off-gas in a part α shown in FIG. 8, located in the middle to upper part in a vertical direction in the gas-liquid separator 25. Here, the specific component in the gas is considered as a desired component and the remaining gas after the specific component is absorbed by the absorbing liquid is referred to as an off-gas. However, the specific component in the gas may be an unnecessary component and the gas after the specific component is absorbed by the absorbing liquid may be a desired gas. On the other hand, the absorbing liquid stored in the gas-liquid separator 25 is a liquid after the absorbing liquid circulated into the fluid passages 2 by the liquid pump 23 absorbs a specific component in the gas circulated into the fluid passages 2 by the compressor 21. The gas-liquid separator 25 temporally stores the absorbing liquid in a part β shown in FIG. 8, located in the lower part in the gas-liquid separator 25. Then, the gas-liquid separator 25 separates the temporally stored off-gas and absorbing liquid. Specifically, the gas-liquid separator 25 discharges the off-gas via the gate valve 26 or the back pressure valve 27. The gate valve 26 is provided to perform control of discharging the off-gas. The back pressure valve 27 is provided to perform control of discharging the off-gas when a pressure inside of the gas-liquid separator 25 is increased and reaches a specific pressure. On the other hand, the gas-liquid separator 25 discharges the absorbing liquid via the gate valve 28. The gate valve 28 is provided to perform control of discharging the absorbing liquid.

Further, in the second embodiment, the off-gas temporally stored in the gas-liquid separator 25 contains the inert gas as the third fluid. The inert gas is initially supplied to the compressor 41 only from the inert gas supply part not illustrated, however the inert gas is supplied to the compressor 41 also from the gas-liquid separator 25 after the inert gas is stored in the gas-liquid separator 25. In either case, the compressor 41 compresses the inert gas and circulates the compressed inert gas from the third supply hole 2u of the minute passage device 1 to the fluid passage 2 via the gate valve 42. In the second embodiment, the compressor 41 is provided as an example of a third supply part. Here, as the compressor 41, a screw type displacement compressor for compressing an inert gas by rotating a screw rotor, a reciprocating displacement compressor for compressing an inert gas by a reciprocation motion of a piston, or the like may be used. Further, a turbo type centrifugal compressor for compressing an inert gas by centrifugal force obtained by the rotation of an impeller, or the like may be used. The gate valve 42 is provided to perform control of circulating the inert gas into the fluid passage 2.

Next, operations of the absorption device 20 according to the second embodiment and an absorption method according to the second embodiment using the absorption device 20 will be explained.

Figure 9:
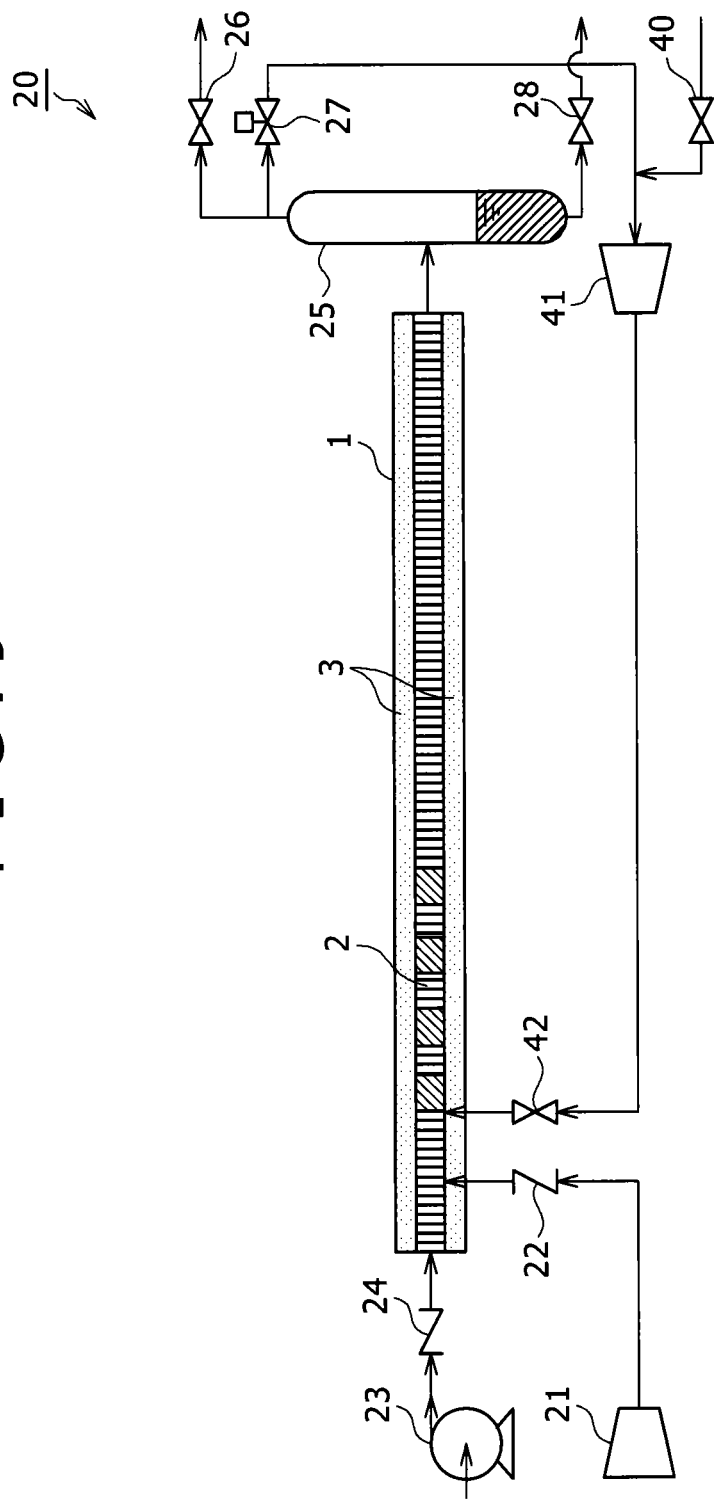
FIG. 9 is a diagram showing, in the absorption device according to the second embodiment, operations of the absorption device when supply of a first fluid and a second fluid to a fluid passage and supply of a third fluid to the fluid passage are simultaneously performed.

FIG. 9 is a diagram showing operations when supply of the gas as the first fluid and the absorbing liquid as the second fluid to the fluid passage 2 and supply of the third fluid to the fluid passage 2 are simultaneously performed.

In an example of the absorption method shown in FIG. 9, the compressor 21 supplies the gas to the fluid passage 2 and the liquid pump 23 supplies the absorbing liquid to the fluid passage 2, and at the same time, the compressor 41 supplies the inert gas to the fluid passage 2. That is, a main circulation step for circulating the gas and the absorbing liquid into the fluid passage 2 to absorb a specific component in the gas by the absorbing liquid and a sub-circulation step for circulating the inert gas as the third fluid into the fluid passage 2 to increase a pressure inside of the fluid passage 2 are simultaneously performed. Thereby, the inert gas is supplied into the fluid passage 2, as represented by four small rectangles, where hatching is applied by oblique lines, in the fluid passage 2 in FIG. 9. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until the pressure inside of the fluid passages 2 is increased and reaches a specific pressure, and as a result, the pressure inside of the fluid passage 2 is increased to a high pressure. Thus, an absorption rate of a specific component in the gas by the absorbing liquid becomes higher. It is noted that the absorbing liquid discharged from the fluid passage 2 is temporally stored in the lower part in the gas-liquid separator 25. Further, the inert gas is also discharged from the fluid passage 2. The discharged inert gas is temporally stored in the upper part in the gas-liquid separator 25 together with the off-gas. Then, the inert gas is again supplied to the compressor 41 via the back pressure valve 27. The compressor 41 circulates the inert gas into the fluid passage 2. By circulating the inert gas in this manner, the amount of the inert gas in use can be reduced.

Figure 10A:
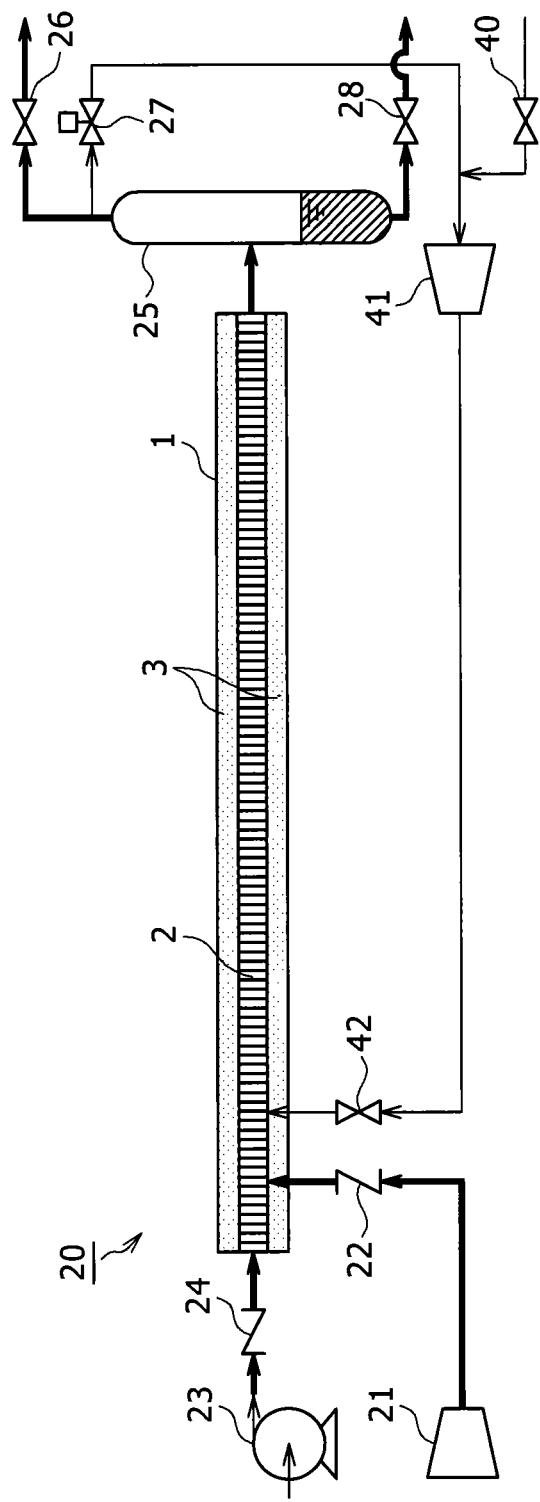
FIG. 10A is a diagram showing, in the absorption device according the second embodiment, operations of the absorption device when supply of the first fluid and the second fluid to the fluid passage is performed.

FIG. 10A and FIG. 10B are diagrams showing operations, in which supply of the gas as the first fluid and the absorbing liquid as the second fluid to the fluid passage 2 and supply of the third fluid to the fluid passage 2 are alternately performed. In FIG. 10A and FIG. 10B, bold arrows show that the fluids are flowing in the passages indicated by the arrows.

First, as shown in FIG. 10A, the compressor 21 supplies the gas to the fluid passage 2 and the liquid pump 23 supplies the absorbing liquid to the fluid passage 2. Thus, the main circulation step for circulating the gas and the absorbing liquid into the fluid passage 2 to absorb a specific component in the gas by the absorbing liquid is performed. In this step, the gate valve 26 is opened and the back pressure valve 27 is closed. By this operation, the off-gas discharged from the fluid passage 2 and temporally stored in the upper part in the gas-liquid separator 25 is discharged directly from the gate valve 26. Thus, the pressure inside of the fluid passage 2 is kept at a low pressure. It is noted that the absorbing liquid discharged from the fluid passage 2 is temporally stored in the lower part in the gas-liquid separator 25.

Next, as shown in FIG. 10B, the compressor 41 supplies the inert gas to the fluid passage 2. By this operation, the inert gas is supplied into the fluid passage 2, as represented by an elongated rectangular, where hatching is applied by oblique lines, in the fluid passage 2 in FIG. 10B. That is, the sub-circulation step for circulating the inert gas into the fluid passage 2 to increase the pressure inside of the fluid passage 2 is performed. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until the pressure inside of the fluid passage 2 is increased and reaches a specific pressure, and as a result, the pressure inside of the fluid passage 2 is increased to a high pressure. Thus, the absorption rate of a specific component in the gas by the absorbing liquid becomes higher. It is noted that the absorbing liquid discharged from the fluid passage 2 is temporally stored in the lower part in the gas-liquid separator 25. Further, the inert gas is also discharged from the fluid passage 2. The third fluid is temporally stored in the upper part in the gas-liquid separator 25 together with the off-gas. Then, the inert gas is again supplied to the compressor 41 via the back pressure valve 27. The compressor 41 circulates the inert gas into the fluid passage 2.

Subsequently, as shown in FIG. 10A, the compressor 21 supplies the gas to the fluid passage 2 and the liquid pump 23 supplies the absorbing liquid to the fluid passage 2 again. That is, the main circulation step is performed again. During this operation, the gate valve 26 is opened and the back pressure valve 27 is closed. By this operation, the off-gas discharged from the fluid passage 2 and temporally stored in the upper part in the gas-liquid separator 25 is directly passing through the gate valve 26. Thus, the pressure inside of the fluid passage 2 is returned to a low pressure. It is noted that the absorbing liquid discharged from the fluid passage 2 is temporally stored in the lower part in the gas-liquid separator 25.

Next, as shown in FIG. 10B, the compressor 41 supplies the inert gas to the fluid passage 2. By this operation, the inert gas is supplied into the fluid passage 2, as represented by an elongated rectangular, where hatching is applied by oblique lines, in the fluid passage 2 in FIG. 10B. That is, the sub-circulation step is performed again. During this operation, the gate valve 26 is closed. Then, by the function of the back pressure valve 27, the off-gas discharged from the fluid passage 2 and temporally stored in the upper part in the gas-liquid separator 25 is made hard to pass through the back pressure valve 27 until the pressure inside of the fluid passage 2 is increased and reaches a specific pressure, and as a result, the pressure inside of the fluid passage 2 is increased to a high pressure again. Thus, the absorption rate of a specific component in the gas by the absorbing liquid becomes higher again. It is noted that the absorbing liquid discharged from the fluid passage 2 is temporally stored in the lower part in the gas-liquid separator 25. Further, the inert gas is also discharged from the fluid passage 2. The discharged inert gas is temporally stored in the upper part in the gas-liquid separator 25 together with the off-gas. Then, the inert gas is again supplied to the compressor 41 via the back pressure valve 27. The compressor 41 circulates the inert gas into the fluid passage 2.

Thereafter, the operations in FIG. 10A and the operations in FIG. 10B are repeated. It is noted that, in the operations described above, having a configuration, in which the off-gas directly passes through the gate valve 26, is an example for not applying a restriction to discharge of the off-gas. Further, having a configuration, in which, by the function of the back pressure valve 27, the off-gas is made hard to pass through the back pressure valve 27 until the pressure inside of the fluid passage 2 is increased and reaches a specific pressure, is an example for applying a restriction to discharge of the off-gas.

By performing semi-continuously the absorption operation for raising the pressure and increasing the absorption amount, as described above, the pressure inside of the fluid passages 2 can be increased and the absorption rate can become higher, as compared to a case where the third fluid is continuously supplied.

In the second embodiment shown in FIG. 10A and FIG. 10B, explanation is made on a case where supply of the gas as the first fluid and the absorbing liquid as the second fluid to the fluid passage 2 and supply of the third fluid to the fluid passage 2 are alternately performed. However, supply of the gas as the first fluid and the absorbing liquid as the second fluid to a fluid passage 2 and supply of the third fluid to a fluid passage 2 can be simultaneously performed by using a plurality of the absorption devices 20. Specifically, a first absorption device 20 comprising a fluid passage 2 and a second absorption device 20, different from the first absorption device 20, comprising a fluid passage 2 are prepared. Then, the main circulation step shown in FIG. 10A and the sub-circulation step shown in FIG. 10B are alternately performed in both of the fluid passage 2 of the first absorption device 20 and the fluid passage 2 of the second absorption device 20. Then, when a pressure is raised in the fluid passage 2 in the second absorption device 20 as shown in FIG. 10B, the gas and the absorbing liquid are circulated into the fluid passage 2 in the first absorption device 20 as shown in FIG. 10A. That is, the main circulation step is performed in the fluid passage 2 of the first absorption device 20, while the sub-circulation step is performed in the fluid passage 2 of the second absorption device 20 at the same time. In this case, the process can be continued when the pressure is raised in the fluid passages 2.

As described above, in the present embodiments and examples, when the absorption operation is performed while the gas as the first fluid and the absorbing liquid as the second fluid are circulated in the fluid passage 2, the third fluid is also supplied to the fluid passage 2. By this configuration, the absorption amount of a specific component per unit volume of the absorbing liquid is increased, and as a result, the absorption rate becomes higher.

Further, in the present embodiments and examples, the following steps are repeated: starting from a state where the pressure inside of the fluid passage 2 is at a low pressure, the pressure inside of the fluid passage 2 is raised by the back pressure valve 27 at a discharging side while the third fluid is supplied to the fluid passage 2. Then, the supply of the third fluid is suspended and the pressure inside of the fluid passages 2 is returned to a low pressure by the gate valve 26 at a discharging side. After the gas as the first fluid and the absorbing liquid as the second fluid are circulated in the fluid passage 2, the pressure inside of the fluid passages 2 is raised again by supplying the third fluid. Thereby, the absorption operation for raising the pressure and increasing the absorption amount can be semi-continuously performed, thus the pressure inside of the fluid passage 2 can be increased and the absorption rate can become higher, as compared to a case where the third fluid is continuously supplied.

Overview of Embodiments

The following is a summary of the embodiments and the examples.

The absorption method according to the embodiments and the examples comprises: a step for preparing a minute passage; a main circulation step for circulating, as a first fluid, a gas containing a component to be absorbed and an absorbing liquid as a second fluid in the minute passage, thereby absorbing the component to be absorbed in the gas by the absorbing liquid; and a sub-circulation step for circulating a third fluid in the minute passage, thereby increasing a pressure inside of the minute passage in a state that the gas and the absorbing liquid are circulated in the minute passage.

In the sub-circulation step, as the third fluid, a fluid exhibiting at least one of properties of being insoluble and being inactive to at least one of the gas and the absorbing liquid may be circulated in the minute passage.

Further, it may be configured that, in the main circulation step, the gas and the absorbing liquid are circulated in the minute passage without applying a restriction to discharge of the gas and the absorbing liquid from the minute passage, in the sub-circulation step, the third fluid is circulated in the minute passage while applying a restriction to discharge of the gas and the absorbing liquid from the minute passage, and after performing the sub-circulation step, the main circulation step is performed again.

Further, it may be configured that, in the step of preparing the minute passage, as the minute passage, a first minute passage and a second minute passage different from the first minute passage are prepared, after performing the sub-circulation step in the first minute passage, the main circulation step is performed again in the first minute passage, after performing the sub-circulation step in the second minute passage, the main circulation step is performed again in the second minute passage, and in parallel with performing the main circulation step in the first minute passage, the sub-circulation step is performed in the second minute passage.

Further, the absorption method may further comprise, after the sub-circulation step, a discharge step for discharging a mixture of the gas, the absorbing liquid, and the third fluid from the minute passage and a separation step for separating the third fluid from the discharged mixture, and, in the sub-circulation step, the separated third fluid may be circulated in the minute passage.

On the other hand, the absorption device according to the embodiments and the examples comprises: a first supply part for supplying, as a first fluid, a gas containing a component to be absorbed; a second supply part for supplying an absorbing liquid as a second fluid; a minute passage for circulating the gas supplied from the first supply part and the absorbing liquid supplied from the second supply part, thereby absorbing the component to be absorbed in the gas by the absorbing liquid; and a third supply part for supplying a third fluid to the minute passage, thereby increasing a pressure inside of the minute passages.

The absorbing device may comprise, as the minute passage, a plurality of minute passages each circulating the gas supplied from the first supply part, the absorbing liquid supplied from the second supply part, and the third fluid supplied from the third supply part.

According to the embodiments and the examples, when a component to be absorbed in a gas is absorbed by an absorbing liquid, an absorption rate becomes higher and an absorption amount per unit volume of the absorbing liquid is increased.

The invention claimed is:

1. An absorption method, comprising:
a main circulation step for circulating, as a first fluid, a gas containing a component to be absorbed and an absorbing liquid as a second fluid in a microchannel, thereby absorbing the component to be absorbed in the gas by the absorbing liquid; and
a sub-circulation step for circulating a third fluid in the microchannel, so as to increase a pressure inside of the microchannel in a state that the gas and the absorbing liquid are circulated in the microchannel,
wherein the main circulation step and the sub-circulation step are alternatingly performed.

2. The absorption method according to claim 1,
wherein, in the sub-circulation step, as the third fluid, a fluid exhibiting at least one of properties of being insoluble and being inactive to at least one of the gas and the absorbing liquid is circulated in the microchannel.

3. The absorption method according to claim 1,
wherein the absorbing of the component to be absorbed in the gas by the absorbing liquid is exothermic.

4. An absorption method, comprising:
a main circulation step for circulating, as a first fluid, a gas containing a component to be absorbed and an absorbing liquid as a second fluid in a microchannel, thereby absorbing the component to be absorbed in the gas by the absorbing liquid; and
a sub-circulation step for circulating a third fluid in the microchannel, thereby increasing a pressure inside of the microchannel in a state that the gas and the absorbing liquid are circulated in the microchannel,
wherein:

in the main circulation step, the gas and the absorbing liquid are circulated in the microchannel without applying a restriction to discharge of the gas and the absorbing liquid from the microchannel;
in the sub-circulation step, the third fluid is circulated in the microchannel while applying a restriction to discharge of the gas and the absorbing liquid from the microchannel; and
after performing the sub-circulation step, the main circulation step is performed again.

5. The absorption method according to claim 4, further comprising a step of preparing the microchannel by preparing a first microchannel and a second microchannel different from the first microchannel, wherein:
after performing the sub-circulation step in the first microchannel, the main circulation step is performed again in the first microchannel;
after performing the sub-circulation step in the second microchannel, the main circulation step is performed again in the second microchannel; and
in parallel with performing the main circulation step in the first microchannel, the sub-circulation step is performed in the second microchannel.

6. An absorption method, comprising:
a main circulation step for circulating, as a first fluid, a gas containing a component to be absorbed and an absorbing liquid as a second fluid in a microchannel, thereby absorbing the component to be absorbed in the gas by the absorbing liquid; and
a sub-circulation step for circulating a third fluid in the microchannel, thereby increasing a pressure inside of the microchannel in a state that the gas and the absorbing liquid are circulated in the microchannel,
further comprising, after the sub-circulation step:
a discharge step for discharging a mixture of the gas, the absorbing liquid, and the third fluid from the microchannel; and
a separation step for separating the third fluid from the discharged mixture,
wherein, in the sub-circulation step, the separated third fluid is circulated in the microchannel.

* * * * *